(12) United States Patent
Rady

(10) Patent No.: US 11,630,298 B2
(45) Date of Patent: *Apr. 18, 2023

(54) PRIME POLYGON REFLECTORS AND METHODS OF USE

(71) Applicant: Todd F. Rady, Menominee, MI (US)

(72) Inventor: Todd F. Rady, Menominee, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/408,280

(22) Filed: Aug. 20, 2021

(65) Prior Publication Data

US 2021/0382300 A1   Dec. 9, 2021

Related U.S. Application Data

(63) Continuation-in-part of application No. 16/664,299, filed on Oct. 25, 2019, now Pat. No. 11,128,951, which is a continuation-in-part of application No. 16/188,575, filed on Nov. 13, 2018, now Pat. No. 10,462,562.

(60) Provisional application No. 62/707,726, filed on Nov. 15, 2017.

(51) Int. Cl.
G02B 26/12 (2006.01)

(52) U.S. Cl.
CPC ................. *G02B 26/121* (2013.01)

(58) Field of Classification Search
CPC ............ G02B 26/121; G02B 2207/123; H04R 1/403; H04R 1/2888
See application file for complete search history.

(56) References Cited

U.S. PATENT DOCUMENTS

| | | | | |
|---|---|---|---|---|
| 4,474,258 A | * | 10/1984 | Westlund | H04R 1/021 181/151 |
| 4,960,468 A | * | 10/1990 | Sinton | H01L 31/0543 136/259 |
| 5,291,331 A | * | 3/1994 | Miano | G02B 5/003 359/853 |
| 5,675,131 A | * | 10/1997 | Saito | H04R 5/02 181/155 |

(Continued)

FOREIGN PATENT DOCUMENTS

| | | | | |
|---|---|---|---|---|
| CN | 107493542 A | * | 12/2017 | ............ H04R 1/40 |
| DE | 3738020 A | * | 5/1989 | ......... E01F 8/0041 |
| JP | 05148919 A | * | 6/1993 | |

*Primary Examiner* — Oyesola C Ojo
(74) *Attorney, Agent, or Firm* — Device Patent LLC

(57) ABSTRACT

Disclosed herein are various forms of prime polygon reflectors. In its various forms it is a device of predetermined geometric shape with aspects and scalable dimensions derived from a prime number and its mathematical square root. Geometric shapes based on the prime polygon have reflective surfaces that cause multiple internal reflections of incident waveform energy. In some forms the reflectors are truncated comprising arrayed truncated prime polygon reflectors. When used in conjunction with or absent absorptive media, coatings, or linings, they reject passage of electromagnetic energy within a band that varies with reflector size and can be used with or without a ground. Applications include but are not limited to acoustic, solar, and radar energy absorption, as well as passive barriers for reduction of electromagnetic radiation exposure, and bandwidth-tunable panels for architectural electromagnetic shielding.

27 Claims, 20 Drawing Sheets

(56) References Cited

U.S. PATENT DOCUMENTS

| | | | | |
|---|---|---|---|---|
| 6,009,972 | A * | 1/2000 | Choi | H04R 1/345 |
| | | | | 181/155 |
| 6,152,257 | A * | 11/2000 | Denham | H04R 1/345 |
| | | | | 181/155 |
| 6,597,797 | B1 * | 7/2003 | Betts | H04R 1/345 |
| | | | | 381/160 |
| 7,162,930 | B2 * | 1/2007 | Hashimoto | G01F 1/662 |
| | | | | 73/861.25 |
| 8,496,358 | B2 * | 7/2013 | McEntee | G02B 5/09 |
| | | | | 362/249.05 |
| 9,482,795 | B2 * | 11/2016 | Tillotson | E04B 1/74 |
| 9,883,283 | B2 * | 1/2018 | Kim | H04R 1/345 |
| 2005/0219845 | A1 * | 10/2005 | Cutler | G02B 6/0096 |
| | | | | 362/261 |
| 2013/0294638 | A1 * | 11/2013 | Huseby | H04R 1/02 |
| | | | | 381/394 |
| 2016/0227315 | A1 * | 8/2016 | Kim | H04R 1/288 |
| 2017/0006376 | A1 * | 1/2017 | Tan | H04R 1/32 |

* cited by examiner

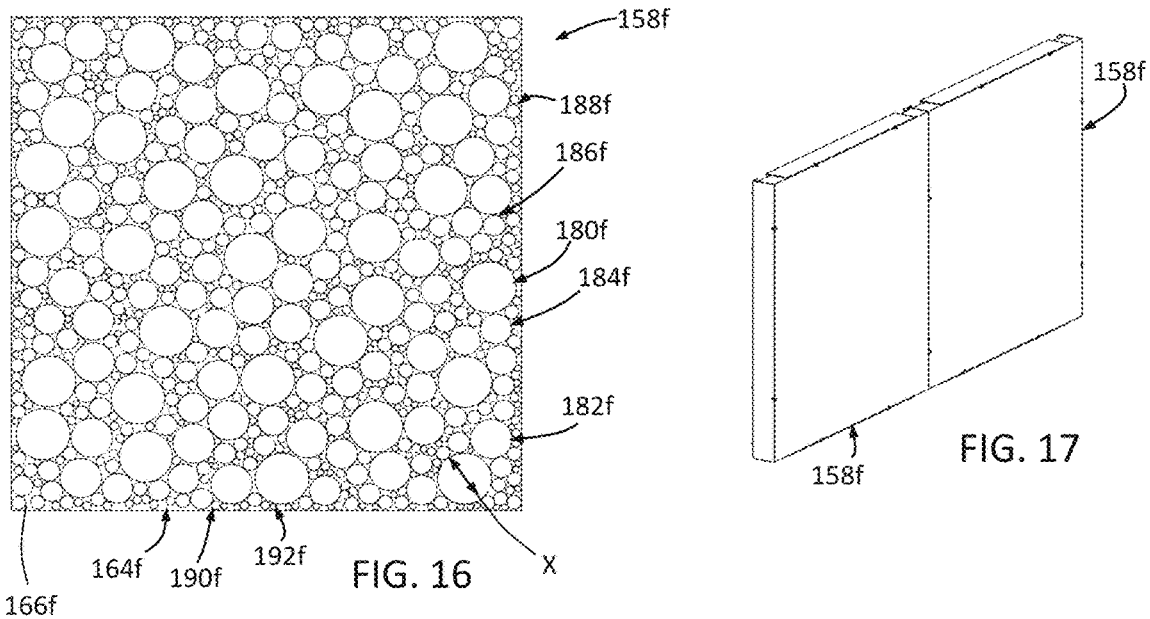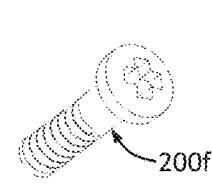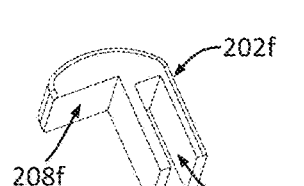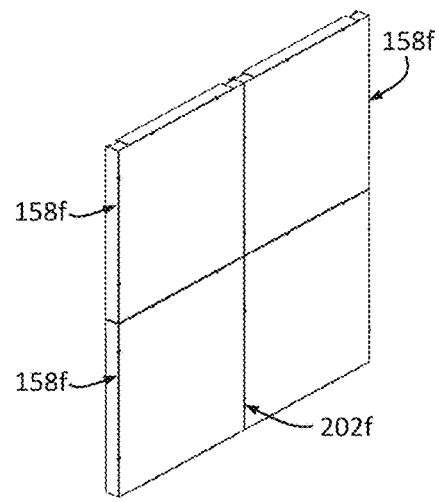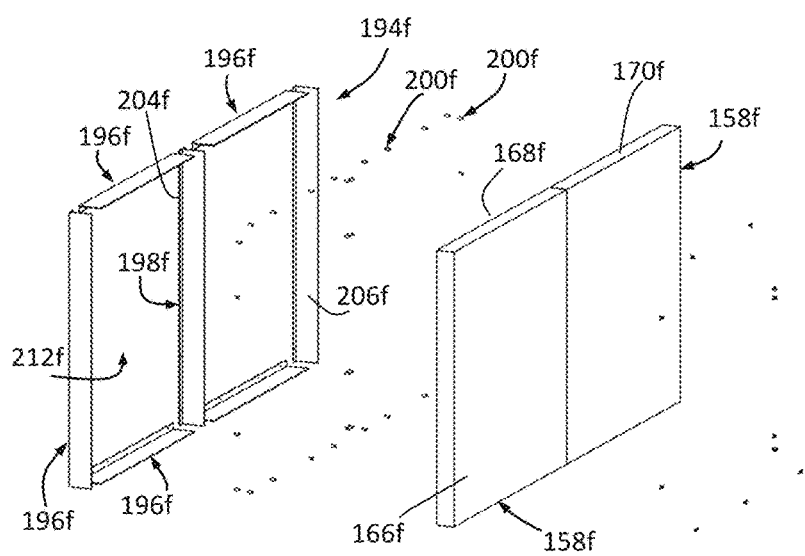

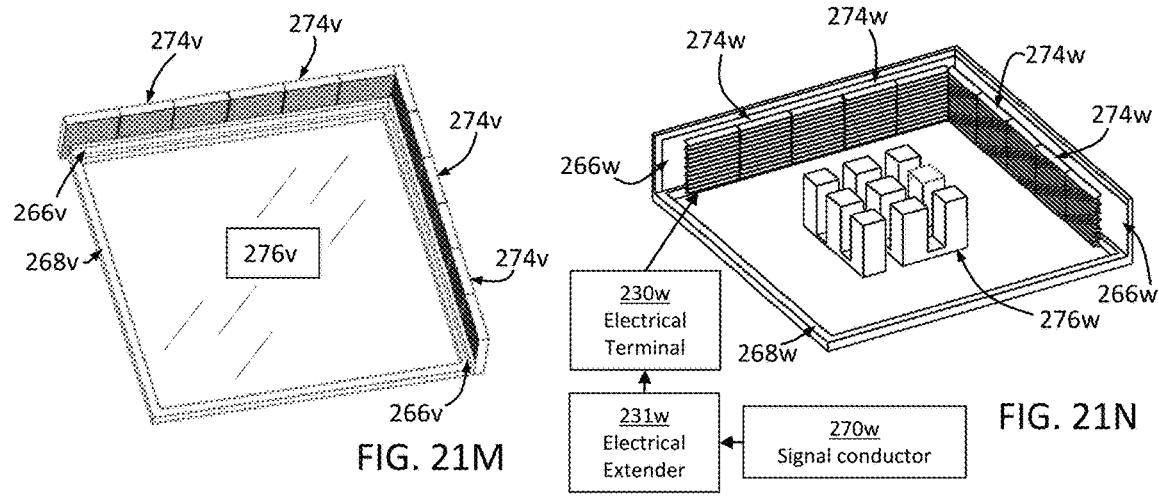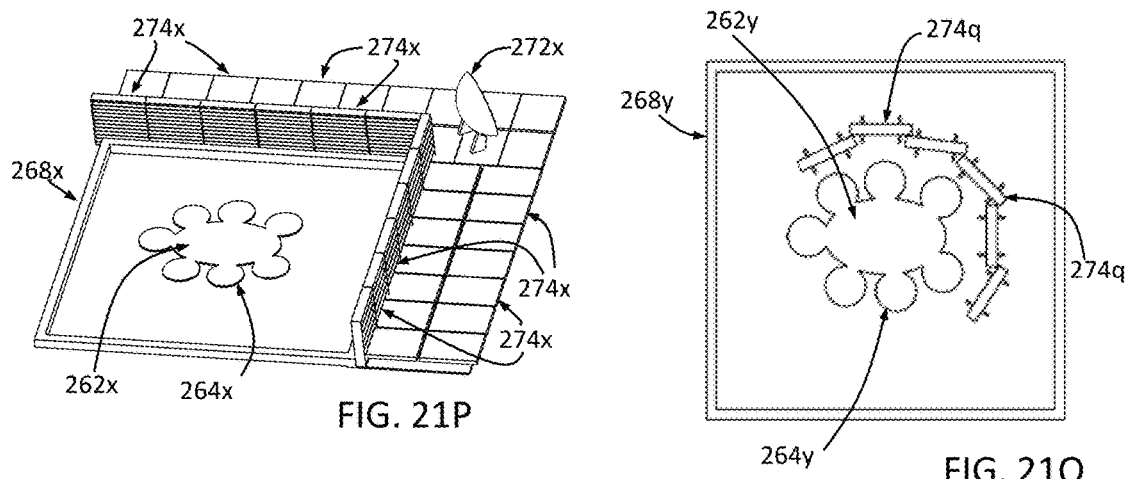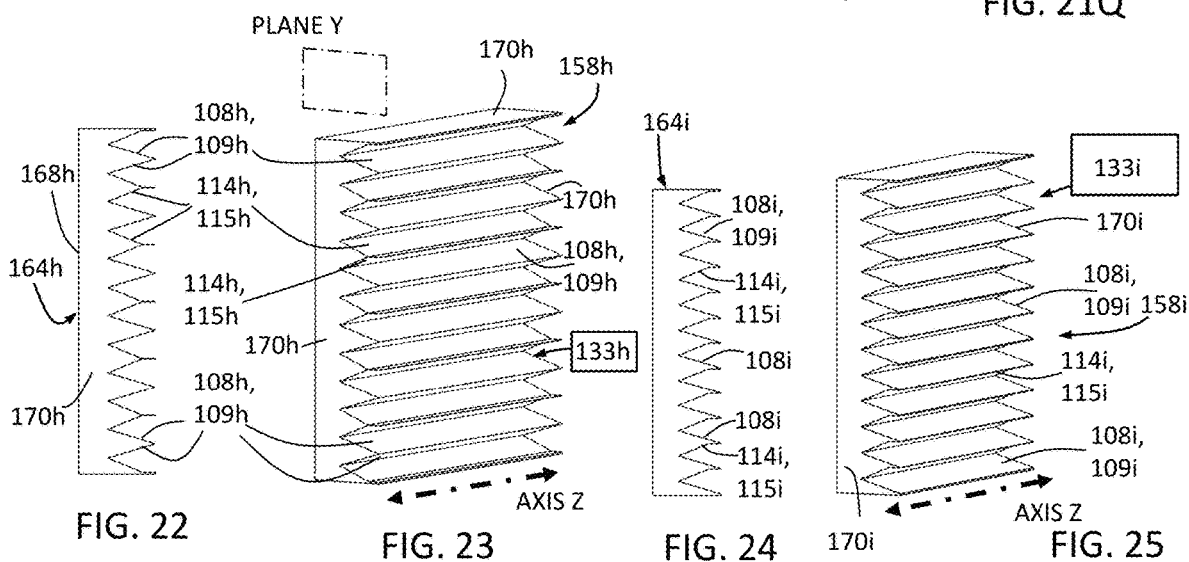

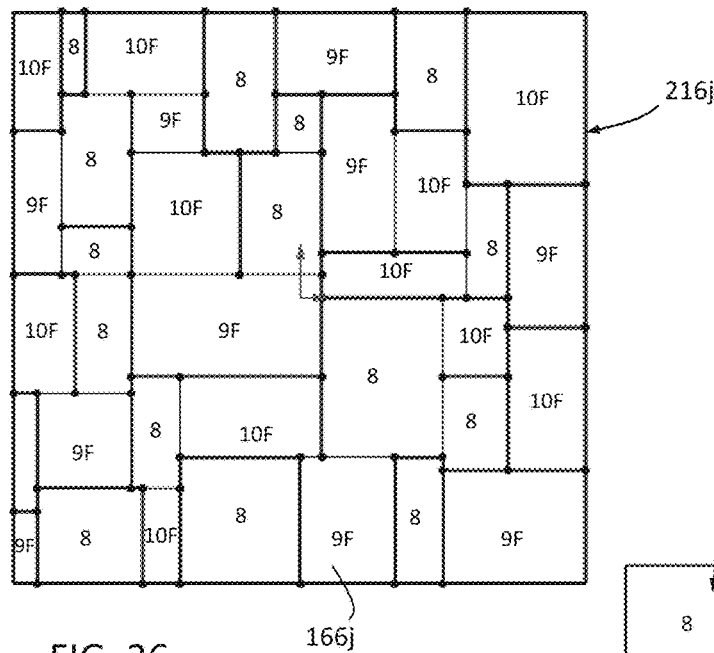
FIG. 26
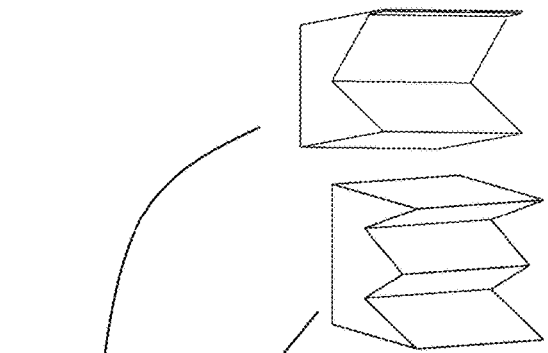
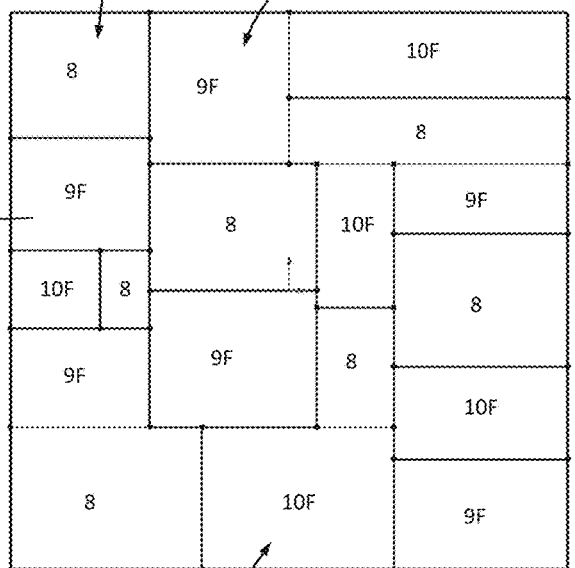
FIG. 27
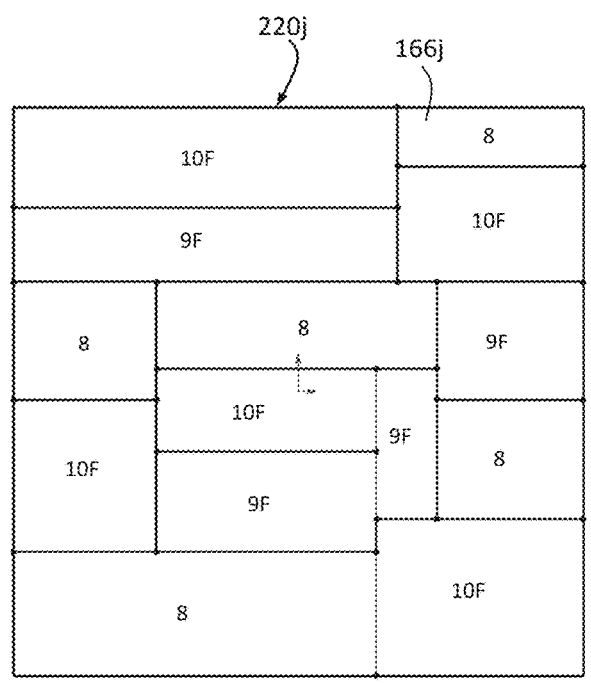
FIG. 28

PRIME POLYGON REFLECTORS AND METHODS OF USE

CROSS REFERENCE TO RELATED APPLICATIONS

This application is a Continuation-In-Part Patent Application claiming priority to Continuation-In-Part patent application Ser. No. 16/664,299 filed on Oct. 25, 2019. This application also claims priority to U.S. Non-Provisional patent application Ser. No. 16/188,575 filed on Nov. 13, 2018 which claims benefit of Provisional Patent Application No. 62/707,726 filed Nov. 15, 2017. The entire disclosures of these applications are hereby incorporated by reference and relied upon.

BACKGROUND OF THE INVENTION

Field of the Invention. The invention relates generally to geometric devices employing multiple reflective elements to significantly reject passage of electromagnetic energy.

Description of Related Art. Two challenges in reducing electromagnetic energy are identifying solutions that are effective within a specified range of frequencies and identifying solutions that are capable of performing their intended function independently of an electrical ground. The latter of these challenges is of particular importance in high rise buildings where the physical distance between shield enclosure or barrier and earth may be significant. Two challenges when working with waveform energy are typically how to capture it or how to diminish it. When the waveform is a radar signal, the transmitted signal strikes an object and some of the energy is reflected which is recognized as an echo signal by the radar receiver. No prior art has been identified that provides reflected waveforms that are not inverted, nor reduced in amplitude through multiple absorptive passes.

When the application is a loudspeaker enclosure, many methods have been utilized to break up, distribute, disperse, or absorb unwanted reflection energy as seen in; JP61100099A by Yoshida, FR2673346 by Hausherr, CA2157518A1 by Blumenkranz, U.S. Pat. No. 4,474,258 by Westlund, 2013/0294638 by Huseby, and KR20060040888A by Kim. No prior art has been identified that diminishes reflected energy by providing multiple reflections and multiple passes through an absorptive media. Similarly, when the application is to capture wave energy from solar or other sources, many attempts have been made as illustrated in U.S. Pat. No. 4,960,468 by Sinton, U.S. Pat. No. 5,291,331 by Miano, and RU2154244 by Strebkov. Although the methods disclosed in this art represents some degree of advancement, improved methods are needed to more effectively diminish or capture waveform energy.

SUMMARY OF THE INVENTION

The article of invention referred to as a prime polygon reflector herein is a device of predetermined geometric shape with aspects and scalable dimensions derived from a prime number and its mathematical square root. Geometric shapes based on the prime polygon have reflective surfaces that cause multiple internal reflections of incident waveform energy. When used in conjunction with absorptive media, coatings, or linings, the waveform energy is forced to pass through the absorptive media multiple times, thereby increasing effectiveness of the media, coating, or lining. Prime polygon reflectors as disclosed herein produce reflected waveforms that are non-inverted by causing an even number of internal reflections. In some forms, devices disclosed herein comprise truncated prime polygon reflector assemblies. Truncated prime polygon reflector assemblies provide a novel approach to the aforementioned challenges. Truncated prime polygon reflector assemblies as disclosed herein significantly reject passage of electromagnetic energy within a band that varies with an exposure reference dimension referred to herein as 'H'. Truncated prime polygon reflector assemblies can be rotated to vary polarization, and can be layered, allowing a stepped approach to difficult electromagnetic energy or interference challenges. Truncated prime polygon reflector assemblies can be used with a ground, however, they do not require an electrical ground to provide benefits.

In one form, one or more prime polygon reflectors are fixed to a structural framework of a device.

In one form, one or more prime polygon reflectors are formed within a structural framework of a device.

In one form, a prime polygon panel is constructed of materials having sufficient strength to contribute to or form primary structural support of a base structure such as a ship, building, aircraft, or other functional apparatus, with prime polygon reflectors tooled or formed into the panel to accept finish application of absorptive media.

In one form, a prime polygon panel thickness is selected to provide structural support to a device, therefore, wall thickness of a panel may be selected by the end user or designer based on the application, with prime polygon reflectors and absorptive media applied to the exposed panel surface.

In one form, an array of prime polygon reflectors includes flat surfaces in between the individual prime polygon reflectors. The flat surfaces may produce inverted waveform reflections. Non-inverted waveform energy is proportional to the percentage of surface area of the prime polygon reflectors versus the total surface area of the panel. Therefore, the overall percentage of non-inverted reflection energy can be increased in some embodiments by placing smaller prime polygon reflectors in the spaces in between and varying reflector sizes. Each diameter prime polygon reflector surface has specific frequency characteristics based on wavelength of incident energy, properties of reflector material, and properties of absorptive media. Multiple reflector sizes may be utilized within any individual panel. The end user or designer can select a combination of reflector sizes to achieve a desired frequency characteristic while maximizing the reflector surface area coverage of the panel.

In one form, if panels are made thin, they can easily be layered and inserted into a structural perimeter frame. This allows the designer to "tune" the absorption bandwidth while also being able to control exterior panel dimensions and structural properties.

In one form, a highly effective, bandwidth-tunable "STEALTH" panel is constructed from multi-layer panels and absorptive media filling the vacant spaces within each prime polygon reflector and between each sheet. Without any absorptive media, a highly sensitive, bandwidth-tunable antenna can be made, by electrically connecting the layers.

In one form, a prime polygon reflector is disclosed having a predetermined geometric shape.

In one form, a prime polygon reflector comprises a predetermined geometric sectional profile that is extended linearly along an axis Z.

In one form, a prime polygon reflector comprises a predetermined geometric sectional profile that is extended along axis Z which is curvilinear.

In one form, a prime polygon reflector is provided with one or more of a coated and a lined reflective surface.

In one form, a prime polygon reflector is configured to receive incident energy that passes through an absorptive media multiple times before being reflected back into the environment.

In one form, absorptive coating or lining is applied to internal surfaces of a prime polygon reflector whereby incident parallel ray energy entering the prime polygon reflector passes through the absorptive media multiple times.

In one form, absorptive media is in the form of but not limited to one or more of: a paint, a one part coating, a two part coating, an epoxy, caulk, sheet, urethane, and bonded film.

In one form, examples of absorptive media that may be applied for acoustic energy absorption includes but is not limited to one or more of: wool, acoustic foams such as SONEX® and multi-density products such as G&S SAE panels, blankets such as Sound Seal® DL100, and coatings such as Hy-Tech® SC #1000 and Noxudol® 3101. Market equivalents to these foams, blankets, and coatings may be used.

In one form, examples of absorptive media that may be applied for radar energy absorption includes but is not limited to one or more of: MWT® materials W-500/501 urethane coating, bonded MAGRAM® film, and MAST Technologies® radar absorbing material (RAM) in the form of at least one of caulk, 2-part systems, bonded films or their equivalents.

In one form, a prime polygon reflector comprises an exposure face positioned generally orthogonal to the path of a generally parallel wave energy source.

In one form, the exposure face is a surface to be exposed by a predetermined parallel ray energy source.

In one form, the exposure face is generally planar of a predetermined length H.

In one form, the exposure face length H is determined by the application and is chosen to accommodate the wave energy source. For example, when used as a speaker cabinet, H is larger than the corresponding speaker driver diameter.

In one form, the exposure face is bounded by a first end and a second end and having a predetermined length H therebetween.

In one form, a prime polygon reflector comprises a first reflective face.

In one form, the first reflective face is angled generally 90-$\alpha$ degrees from the exposure face.

In one form, the angle $\alpha$ has a nominal value approaching 16.917899 degrees.

In one form, the angle $\alpha$ is between 15.63673292 and 18 degrees.

In one form, the first reflective face has a length generally $\sqrt{3}$ times predetermined length H of the exposure face.

In one form, the first reflective face has a length generally $\sqrt{3}$ times predetermined length H of the exposure face with tolerance between +0.15$\sqrt{3}$H and −0.15$\sqrt{3}$H (+/−15%).

In one form, the first reflective face is bounded by a third end and a fourth end.

In one form, the second end of the exposure face intersects the third end of the first reflective face.

In one form, a prime polygon reflector comprises a second reflective face.

In one form, the second reflective face is bounded by a fifth end and a sixth end.

In one form, the fifth end of said second reflective face intersects said fourth end of said first reflective face.

In one form, the second reflective face is angled generally 90 degrees minus 3 times the angle $\alpha$ (also known as $\beta$) from the first reflective face.

In one form, a third reflective face is bounded by a seventh end and an eighth end.

In one form, the third reflective face extends generally orthogonal from the first end of the exposure face until intersection with the second reflective face.

In one form, the seventh end of a third reflective face is joined to the sixth end of the second reflective face.

In one form, the eighth end of the third reflective face is joined to the first end of the exposure face.

In one form, an exposure face, a first reflective face, a second reflective face, and a third reflective face are generally planar and positioned perpendicular to a common plane Y.

In one form, angle $\alpha$ is less than 90 degrees.

In one form, the first reflective face and the second reflective face define a reflection chamber therebetween.

In one form, the first reflective face, the second reflective face, and third reflective face define a reflection chamber therebetween.

In one form, a first reflective face and a second reflective face are arranged in a predetermined geometric orientation.

In one form, parallel ray energy entering a prime polygon reflector lined with absorptive media is reflected a plurality of times within the prime polygon reflector causing the parallel ray energy to be diminished with each pass through the absorptive media.

In one form, the absorptive media within a prime polygon reflector is in the form of a solar cell for absorption of solar energy.

In one form, parallel ray energy is directed generally perpendicular towards the exposure face.

In one form, a portion of the exposure face is removed from the point a distance H/6 from the second end of the exposure face to a point H/6.316011 from the first end of the exposure face.

In one form, exposing a prime polygon reflector to parallel ray energy at its exposure face provides four internal reflections of the parallel ray energy and produces equal total reflective path travel lengths at its points of convergence.

In one form, applying an absorptive coating or lining to interior surfaces of the prime polygon reflector causes incident parallel ray energy to pass through the absorptive media multiple times, increasing effectiveness of the absorptive media.

In one form, each ray at the envelope boundary is reflected an even number of times thereby keeping the parallel ray energy non-inverted in phase.

In one form, an absorptive lining is applied to interior reflective surfaces and incoming rays pass through an absorptive lining 8 times.

In one form, a total distance traveled by a first ray entering a prime polygon reflector is generally equal to a total distance traveled by a second ray thereby producing a reflection envelope boundary that is coherent in time at its point of convergence.

In one form, reflected energy from a ray enters and exits a prime polygon reflector at the same location.

In one form, rays entering a prime polygon reflector at various points along the reflector's exposure face experience 4 reflections (an even number) within the prime polygon reflector before exiting and do not exhibit 180 degree phase shift.

In one form, parallel ray energy reflected in a prime polygon reflector experiences a significantly reduced reflection energy that is coherent in time and non-inverted in phase.

The various embodiments of the disclosed prime polygon reflector have many applications, some of which are listed here. In one form, a prime polygon reflector is an acoustic structure that absorbs nearly all of the input energy.

In one form, a prime polygon reflector is configured as an effective loud speaker cabinet.

In one form, a prime polygon reflector is configured for use as ambient noise control.

In one form, a prime polygon reflector is configured as an RF absorber (i.e. radar) wherein the prime polygon reflector produces a reflection of minimal magnitude that is non-inverted.

In one form, a prime polygon reflector is configured as a solar absorber for effective absorption of incident energy as well as reclamation of initial reflected energy.

In one form, the basic shape of the prime polygon reflector can be one or more of arrayed, scaled, and dissected if limited by physical space.

In one form, an array of prime polygon reflectors comprises a plurality of prime polygon reflectors each having the same diameter across an exposure face.

In one form, an array of prime polygon reflectors comprises a plurality of prime polygon reflectors of two or more diameters across an exposure face.

In one form, one or more prime polygon reflectors are seated within a tapered bore extending at least partially into an array panel.

In one form, one or more prime polygon reflectors are seated within a straight bore extending at least partially into an array panel.

In one form, the thickness 'T' of an array panel may vary.

In one form, array panel thickness 'T' is greater than, less than, or equal to a particular prime polygon reflector depth R.

In one form, an array panel comprises a front face, a rear face, and one or more end faces.

In one form, bores for seating a prime polygon reflector do not extend through the entire thickness 'T' of an array panel.

In one form, an array panel comprises one or more fastening bores for securing a prime polygon reflector array in a predetermined position to a wall or other anchoring structure.

In one form, a non-polarized array of prime polygon reflectors is used as an ambient noise control panel in environments where frequency and location of noise vary.

In one form, an array panel having a structural base material is imprinted with varied sized prime polygon reflectors.

In one form, an array panel may include one or more of a first prime polygon reflector of a given diameter X, and any combination of one or more progressively smaller prime polygon reflectors.

In one form, combining a variety of prime polygon reflectors in an array panel minimizes the flat surfaces between adjacent prime polygon reflectors consequently reducing the incidence of producing inverted waveform reflections In one form, a noise control panel comprising a structural base material with varied sized prime polygon reflectors imprinted thereon are positioned with ends adjacent to each other forming enlarged noise control surfaces. Surfaces of the prime polygon reflectors are covered with a predetermined absorptive media.

In one form, an array panel is sufficiently thick to also serve as a structural panel material such as used in construction of ships, buildings, aircraft, and other structures.

In one form, an array panel is thin and thus unable to serve as a structural panel but may be fixed to a structure.

In one form, a multi-layer array panel comprises absorptive media disposed between one or more sheets.

In one form, materials of construction will vary depending on the application; however the materials need only to be efficient at reflecting the type of energy input, and capable of maintaining form, fit, and function under loading combinations of the application.

In one form, a prime polygon reflector is optimized based on the wavelengths of energy to be absorbed and the structural design requirements of the application.

In one form, a panel frame is utilized to couple a prime polygon reflector array to a structure such as a wall.

In one form, a panel frame comprises one or more end struts.

In one form, a panel frame comprises an intermediate strut.

In one form, an end strut comprises a base rib and panel rib extending from the base rib.

In one form, a prime polygon reflector array is configured as a vertically, horizontally, or angularly polarized prime polygon absorption panel for absorption of single wavelength radar.

In one form, disposed on a front side of a prime polygon reflector array and extending linearly from opposing sides is a plurality of vertically, horizontally, or angularly spaced first reflector faces on first reflector walls and a plurality of second reflective faces on second reflective walls.

In one form, a prime polygon reflector array comprises one or more first prime polygon reflectors of a given diameter X, and any combination of one or more progressively smaller prime polygon reflectors.

In one form, absorption characteristics are a function of prime polygon reflector diameter and energy wavelength. Varying size of individual reflectors within a single array provides an absorption bandwidth that is tunable by the designer.

In one form, a first reflective face and a second reflective face is covered by a radio frequency (RF)/radar absorptive media.

In one form, prime polygon geometric relationships are utilized to form reflective faces on an array panel.

In one form, a prime polygon reflector array is configured as a vertically, horizontally, or angularly polarized prime polygon reflector array for absorption of a pre-determined bandwidth radar.

In one form, a prime polygon reflector array is constructed from a plurality of individual array panels.

In one form, the plurality of individual array panels are sandwiched together and held as a prime polygon reflector array assembly.

In one form, a prime polygon reflector array assembly is at least partially held together by a non-reflective perimeter framing.

In one form, individual array panels comprise regions within the front face corresponding to a particular prime polygon geometric relationship used in that region.

In one form, a custom absorption spectra is created by varying the exposure face height H and layering a combination of prime polygon reflector array panels.

In one form, prime polygon reflectors are scribed into a prime polygon reflector array panel by stamping or die-forming into a thin reflective substrate.

In one form, prime polygon reflectors are tooled into an exterior surface of a thick array panel.

In one form, the reflection chambers defined herein are formed based on an exposure wall with exposure face thereon and reflective walls and reflective faces thereon. These exposure and reflective faces are positioned according to the predefined geometric polygon conditions and comprise coincident reference lines thereon. In various embodiments, portions of one or more of the exposure walls and exposure faces and reflective walls and reflective faces are truncated. At locations where this truncation occurs, the coincident reference lines for each of these faces remain and control the predefined reflection chamber geometry. Therefore, underlying an exposure face is an exposure reference, underlying a first reflective face is a first reflective reference, underlying a second reflective face is a second reflective reference, and underlying a third reflective face is a third reflective reference.

In one form, one or more reflective walls and/or exposure wall with associated faces thereon may be truncated for reasons such as space limitations, however the geometric relationship between the reflective faces and reflective walls as measured from inside the associated reflection chamber remain the same.

In one form, an exposure wall, a first reflective wall, a second reflective wall, and a third reflective wall with respective faces form a geometrically distinct polygon as measured from inside the associated reflection chamber. Despite portions of these faces and walls being truncated in some embodiments, a distinct intersection between reference lines associated with these exposure and reflective walls/faces remain.

In one form, absorptive media in a revolved geometry prime polygon reflector may be in the form of a solar collector such as solar film or coating.

In one form, truncated prime polygon reflector assemblies are installed as a passive means to reduce electromagnetic radiation exposure to occupants of buildings where high power cellular phone or other data transmission equipment is sited on the rooftop of office or apartment buildings.

In one form, a truncated prime polygon reflector assembly is non-conductively framed and fit to the exterior of an existing shield enclosure to increase shielding effectiveness within the rejection band of the truncated prime polygon reflector assembly.

In one form, multiple truncated prime polygon reflector assemblies of differing rejection bands are layered in a non-conductive frame and fit to the exterior of an existing shield enclosure to provide supplemental broadband shielding that cannot be disabled by severing the enclosure ground.

In one form, truncated prime polygon reflector assemblies are pre-formed conductive panels intended to replace flat conductive panels used in construction of traditional shield enclosures.

In one form, a truncated prime polygon reflector assembly comprises insertion of reflective elements through pre-slotted enclosure or room framing members such as wall studs, joists, or rafters. In this form, the shielding effectiveness of an enclosure is passively increased within the rejection band of the truncated prime polygon reflector assembly. This passive increase is functional in the event of loss of shield enclosure ground and is not visible to a casual observer.

In one form, a truncated prime polygon reflector assembly is a pre-stamped panel of thin, reflective substrate for installation between wall studs, floor joists, rafters or truss members intended to fit standard commercial and residential buildings.

In one form, truncated prime polygon reflector assembly is a pre-formed non-reflective substrate for installation between wall studs, floor joists, rafters or truss members. At least a portion of the assembly is then dipped, sprayed, foil faced or by other means provided with a reflective surface. Low cost examples would include injection molded or formed foam panels dipped or sprayed with reflective paint or coating.

In one form, a truncated prime polygon reflector assembly is enclosed in a portable, self standing partition to provide temporary preventative protection against Bluetooth eavesdropping during meetings or conferences.

In one form, a truncated prime polygon reflector assembly is enclosed in a portable, self standing partition and electrically connected to the ground conductor of a standard electric appliance cord to make use of electrical ground of a facility such as a hotel or restaurant conference room to enhance wireless privacy during meetings or conferences.

In one form, a truncated prime polygon reflector assembly is non-conductively anchored to or adjacent to interior surfaces of a shield enclosure or shielded room, and electrically connected to the signal conductor of an electrical circuit. Provided with an appropriate ground, the signal conductor may be used for interior enclosure spectral monitoring, or can be used to radiate a jamming signal, initiated manually or as an output from an alarm system in response to a fault condition such as a detected loss of primary enclosure ground or detection of an intruder.

In one form, reflective elements structurally incapable of being formed by stamping are inserted into pre-slotted inserts for installation between existing framing members.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 16 depicts a front view of a non-polarized prime polygon reflector array comprising prime polygon reflectors of a range of diameters according to one or more embodiments shown and described herein;

FIG. 17 depicts a perspective view of a plurality of prime polygon reflector arrays arranged at their end faces to form larger surface areas according to one or more embodiments shown and described herein and wherein the panels are shown with smooth face as they may appear after finish treatment with absorptive media;

FIG. 18 depicts a perspective view of a larger plurality of prime polygon reflector arrays arranged at their end faces to form larger surface areas according to one or more embodiments shown and described herein and wherein the panels are shown with smooth face as they may appear after finish treatment with absorptive media;

FIG. 19 depicts an exploded view of a typical panel frame utilized for mounting one or more prime polygon reflector arrays to a structure using frame fasteners in the form of screws illustrated in perspective view in FIG. 19a and panel retainers as illustrated in perspective view in FIG. 19b according to one or more embodiments shown and described herein;

FIG. 21M is a cutaway perspective view of a building having truncated prime polygon reflector assemblies framed to the exterior of an existing shield enclosure;

FIG. 21N is a cutaway perspective view of a building wherein truncated prime polygon reflector assemblies are positioned adjacent to interior surfaces of a shield enclosure;

FIG. 21P is a cutaway perspective view of a building utilizing truncated prime polygon reflector assemblies passively installed against a building;

FIG. 21Q is a top view of a conference room with portable truncated prime polygon reflector assemblies partially encircling participants meeting at a conference table;

FIG. 22 is an end view of another vertically polarized prime polygon absorption panel for single wavelength radar with absorptive material removed according to one or more embodiments shown and described herein;

FIG. 23 is a perspective view of the vertically polarized prime polygon absorption panel of FIG. 22 with absorptive material removed according to one or more embodiments shown and described herein;

FIG. 24 is an end view of yet another vertically polarized prime polygon absorption panel for single wavelength radar with absorptive material removed according to one or more embodiments shown and described herein;

FIG. 25 is a perspective view of the vertically polarized prime polygon absorption panel of FIG. 24 with absorptive material removed according to one or more embodiments shown and described herein;

FIG. 26 is a front view of a prime polygon reflector array comprising a variety of different prime polygon reflector cross sections of varying exposure face height in various regions of the array to provide a tuned bandwidth according to one or more embodiments shown and described herein;

FIG. 27 is a front view of another variation of a prime polygon reflector array comprising a variety of different prime polygon reflector cross sections of varying exposure face height in various regions of the array to provide a tuned bandwidth according to one or more embodiments shown and described herein (selected prime polygon reflectors are illustrated as broken out perspective views);

FIG. 28 is a front view of yet another variation of a prime polygon reflector array comprising a variety of different prime polygon reflector cross sections of varying exposure face height in various regions of the array to provide a tuned bandwidth according to one or more embodiments shown and described herein;

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Figure 1:
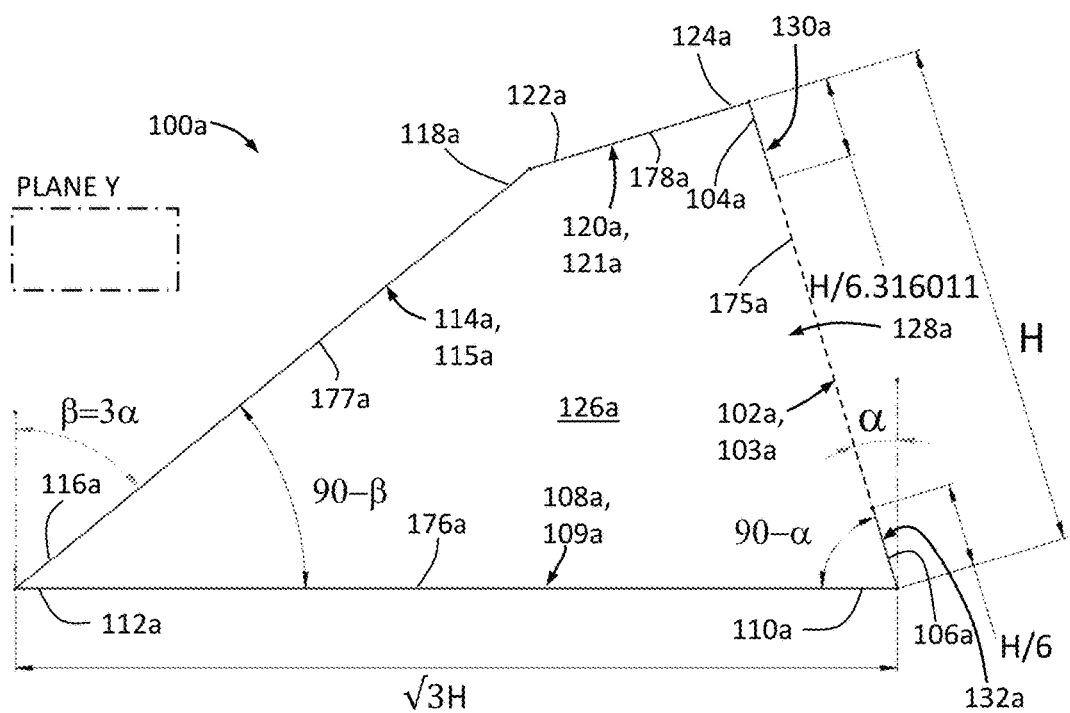
FIG. 1 depicts a geometric representation of various faces of a prime polygon reflector with underlying references illustrating defined geometric relationships according to one or more embodiments shown and described herein.

FIG. 1 illustrates prime polygon geometry 100a in a preferred embodiment of a prime polygon reflector. As illustrated, the geometric relationship is driven by a chosen height 'H' of an exposure face 102a as deemed useful for a given application. Geometric measurements reflect internal dimensions of reflection chamber 126a before application of any absorptive materials and are measured from the terminal ends of each face exposed in reflection chamber 126a where the faces geometrically intersect. Exposure face 102a comprises a first end 104a and a second end 106a and therefore is generally an internal measure between the exposure face 102a intersection with first reflective face 108a and third reflective face 120a of reflection chamber 126a.

In various embodiments, portions of one or more of the exposure walls and exposure faces and reflective walls and reflective faces are truncated. At locations where this truncation occurs, the coincident reference lines (in phantom) for each of these faces remain and control the predefined reflection chamber geometry. As illustrated in FIG. 1, underlying an exposure face 102a is an exposure reference 175a, underlying a first reflective face 108a is a first reflective reference 176a, underlying a second reflective face 114a is a second reflective reference 177a, and underlying a third reflective face 120a is a third reflective reference 178a.

Further in this embodiment, first reflective face 108a is angled from exposure face 102a by (90−α) degrees (generally 73.082101 degrees). As illustrated, α is generally equal to 16.917899 degrees. The internal measure of first reflective face 108a from intersection at third end 110a and fourth end 112a is nominally (√3 times H). As square root three is an exact mathematical value, and scaling factors close to this value are capable of producing reflection chambers with desirable properties, a tolerance of +/−15% square root three is applied, precluding competitive designs from using scaling factors close to square root three and arguing angular restrictions on alpha therefore do not apply.

Second reflective face 114a is angled from first reflective face 108a at intersection of fourth end 112a of first reflective face 108a and fifth end 116a of second reflective face 114a at an angle 90−β degrees (wherein β=3 times α). Third reflective face 120a extends from eighth end 124a generally orthogonal from first end 104a of exposure face 102a. The length of second reflective face 114a, and third reflective face 120a are determined by the intersection of these two faces at sixth end 118a of second reflective face 114a and seventh end 122a of third reflective face 120a. As illustrated, the exposure face 102a, and the first, second, and third reflective faces 108a, 114a, and 120a form a polygon.

The exposure face and each reflective face are disposed on a corresponding wall facing the reflection chamber. For example, exposure face 102a is disposed on exposure wall 103a, first reflective face 108a is disposed on first reflective wall 109a, second reflective face 114a is disposed on second reflective wall 115a, and third reflective face 120a is disposed on third reflective wall 121a. Each wall is manufactured of materials capable of reflecting an energy wave such as sound for example. In a preferred embodiment, walls are constructed of a wood material. In alternative embodiments, walls are constructed of polymers, composites, metals, or other materials sufficiently capable of reflecting energy waves and structurally capable of maintaining form, fit, and function under external physical loading combinations of the application.

In this embodiment, a window 128a is provided through the exposure face 102a of the prime polygon as illustrated using the dashed line. It is through window 128a that parallel wave energy enters and exits the prime polygon reflector. In this embodiment, window 128a is offset along exposure face 102a from third reflective face 120a by a distance generally H divided by 6.316011 and offset along exposure face 102a from first reflective face 108a by a distance generally H divided by 6. In this embodiment, window 128a defines first exposure tab 130a and second exposure tab 132a.

Figure 2:
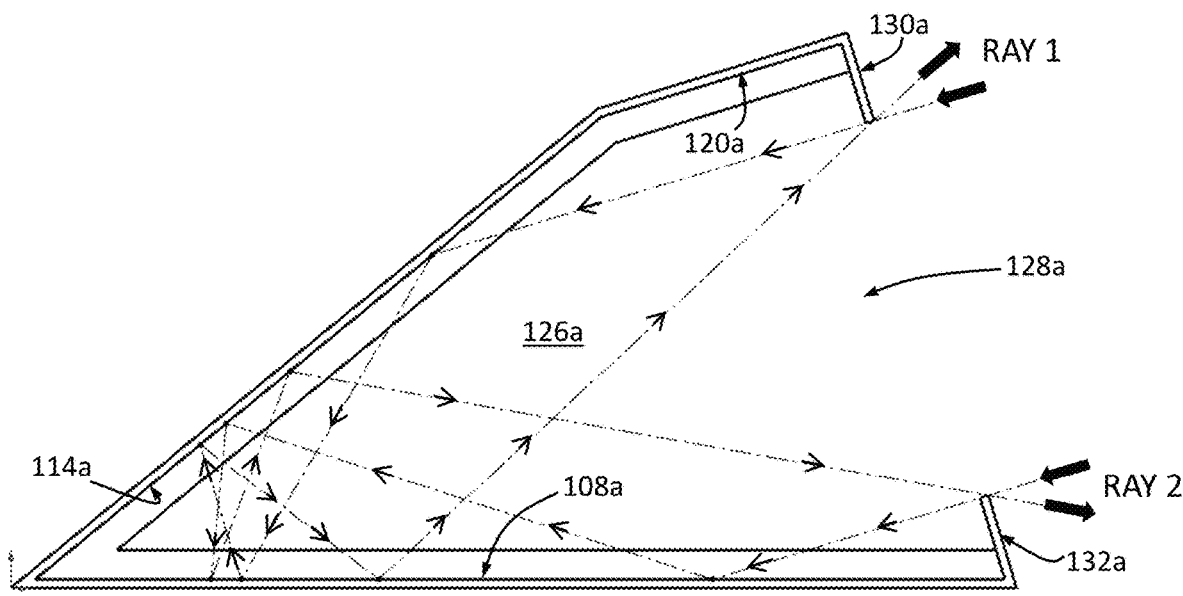
FIG. 2 depicts a section view of various faces of a prime polygon reflector illustrating the path of parallel ray energy entering and exiting a prime polygon reflector at two different locations according to one or more embodiments shown and described herein. In this embodiment, each ray exits the prime polygon reflector at their respective entrance points.

FIG. 2 illustrates parallel ray energy entering and exiting a preferred embodiment of a prime polygon reflector at two locations. The total distance traveled by RAY 1 is equal to the total distance traveled by RAY 2 producing a reflection envelope boundary that is coherent in time by virtue of equal length travel paths. Note also in this embodiment, the reflected energy from RAY 1 exits the prime polygon reflector at the same location as it entered. Similarly the reflected energy from RAY 2 exits the prime polygon reflector at the same location that it entered. RAYs 1 and 2 each experience 4 reflections (an even number) within the prime polygon reflector and therefore do not exhibit a 180 degree phase shift. Parallel ray energy entering the prime polygon reflector in between RAY 1 and RAY 2 also experiences 4 reflections before exiting. Applying an absorptive coating or lining to interior surfaces of the prime polygon reflector causes incident parallel ray energy to pass through the absorptive media multiple times, increasing effectiveness of the absorptive media.

The inventor has completed extensive experimentation to determine a range of values for a that creates a reflection chamber envelope producing multiple even number reflections without the 180 degree phase shift of a normal reflector. Based on these experiments, best results are achieved when a ranges between 15.63673292 and 18.0 degrees.

Figure 3:
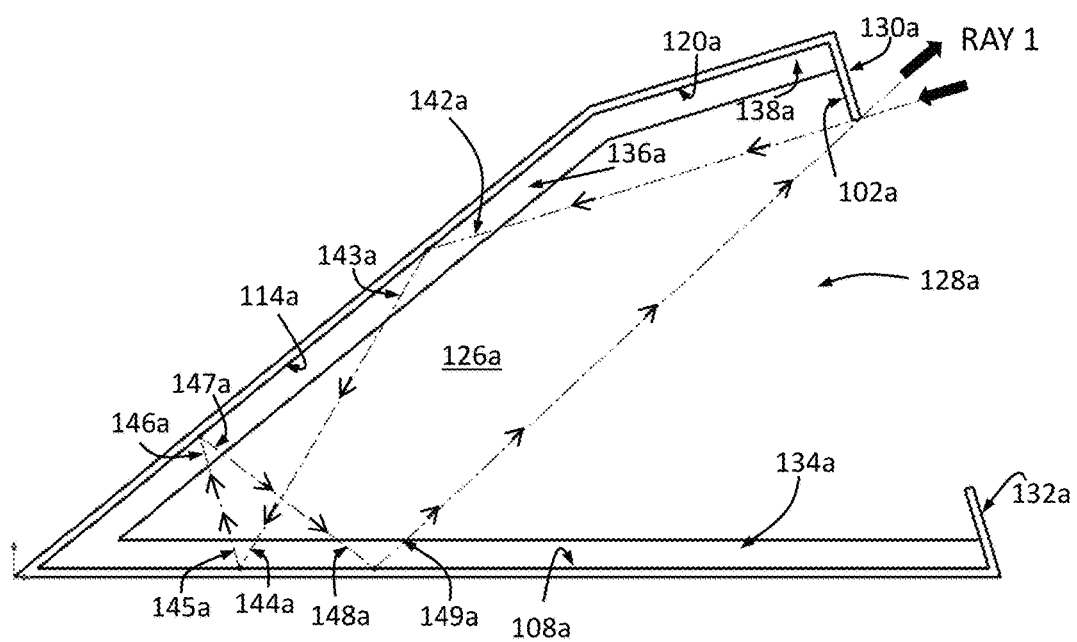
FIG. 3 depicts a section view of various faces of a prime polygon reflector with absorptive lining and further illustrates the path of a single ray entering through a window near a first end of an exposure face according to one or more embodiments shown and described herein.
Figure 4:
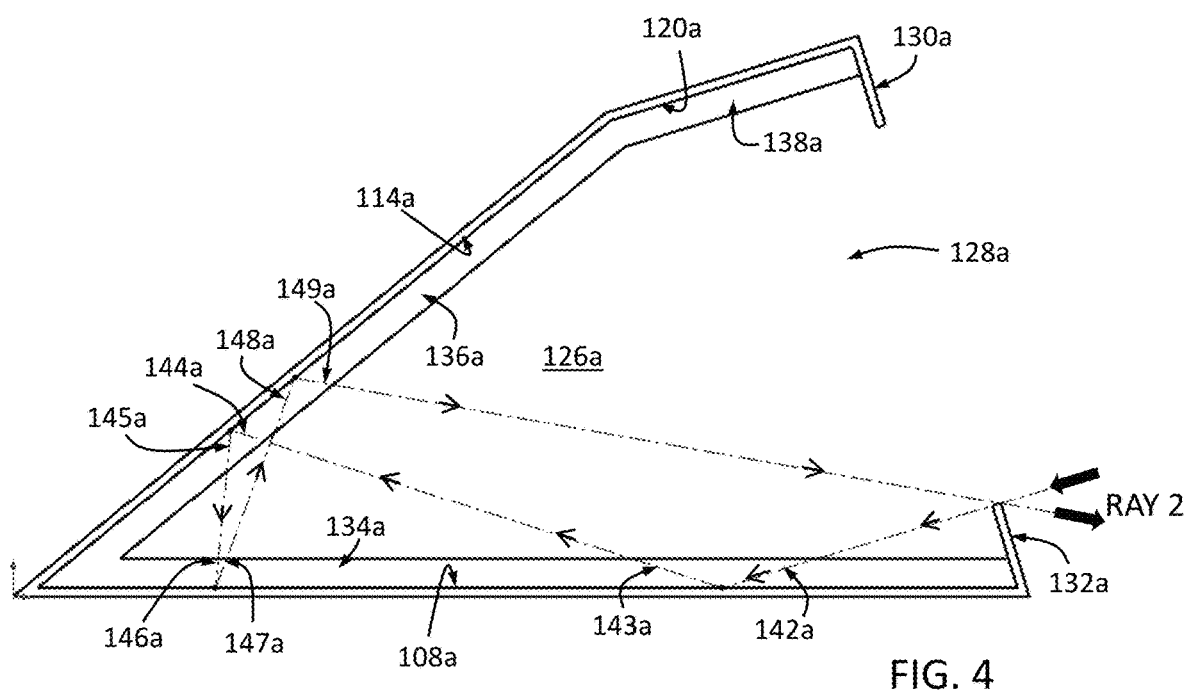
FIG. 4 depicts a section view of various faces of a prime polygon reflector with absorptive lining and further illustrates the path of a second single ray entering through a window near a second end of an exposure face according to one or more embodiments shown and described herein.

FIGS. 3 and 4 illustrate a prime polygon reflector internally lined with absorptive media and the path of two sample rays (RAY1 and RAY2) as they are reflected in the reflection chamber 126a and travel through the absorptive media. In preferred embodiments, the absorptive media covers first reflective face 108a, second reflective face 114a, and third reflective face 120a inside reflection chamber 126a. In some embodiments, absorptive media may also cover portions of first exposure tab 130a and second exposure tab 132a each facing reflection chamber 126a. The absorptive media may assume a variety of forms suitable for the application. For example, for some applications the absorptive media may be in the form of sections of flat panels that are sized to a corresponding reflective face. In other applications, the absorptive media may be molded to fit a reflection chamber of a particular size or shape. In other applications, the absorptive media may be sprayed, brushed, dipped or poured directly on one or more reflective faces or onto a mold surface sized and shaped for later application against a reflective face. Many of these techniques will produce completely filled profiles of absorptive media with a smooth or other desired surface.

FIG. 3 illustrates full travel path of incident RAY 1, and FIG. 4 shows the full travel path of incident RAY 2. In each of FIGS. 3 and 4, a sequential number is assigned each time the incident energy ray passes through the absorptive media lining. As indicated in FIGS. 3 and 4, each incident energy ray passes through the absorptive media a total of 8 times. For example, the first absorptive pass occurs at 142a, the second absorptive pass occurs at 143a, the third absorptive pass occurs at 144a, the fourth absorptive pass occurs at 145a, the fifth absorptive pass occurs at 146a, the sixth absorptive pass occurs at 147a, the seventh absorptive pass occurs at 148a, and the eighth absorptive pass occurs at 149a. Incident energy rays entering the prime polygon reflector between the entrance points of RAY 1 and RAY 2 (i.e. through window 128a) also pass through the absorptive media nominally 8 times. Assuming a structure forming the shape of the prime polygon reflector is of adequate structural integrity to retain its shape and of suitable material to reflect incident energy perfectly, effectiveness of the absorptive media is increased by a nominal factor of 8 by virtue of the incident energy being reflected to pass through the absorptive media multiple times. As an example, an absorptive media capable of 3 dB absorption at each pass would approach 8X 3 dB=24 dB (99.6%) energy absorption when applied to the interior surfaces of a prime polygon reflector as disclosed herein. The remaining 0.4% rejected energy, having been reflected an even number of 4 times would not exhibit the 180 degree phase shift normally associated with an incident, normal reflection. As a point of comparison, radar absorbing coatings such as MWT Materials MF-500/501 or MAST Technologies MAGRAM publish absorption values of 4-20 db for X-band radar applications (8-12 GHz) at applied thickness of 1-3 mm.

Figure 5:
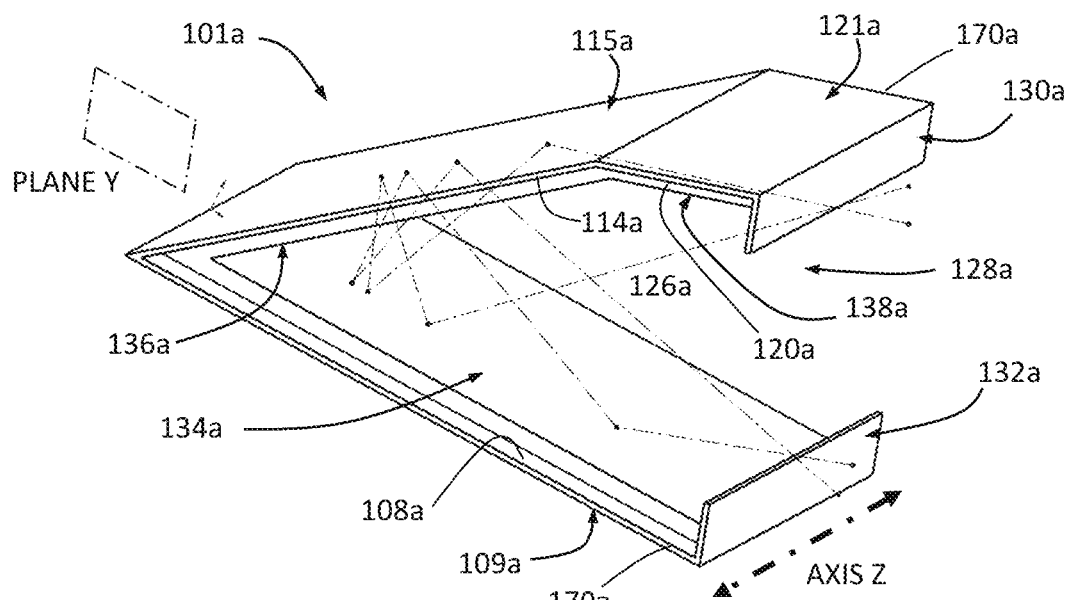
FIG. 5 depicts a partial perspective view of a prime polygon reflector in an elongate configuration illustrating two samples of ray energy being reflected and passing through an absorptive media according to one or more embodiments shown and described herein.

FIG. 5 illustrates a perspective view of a prime polygon reflector in an elongated configuration with two samples of ray energy reflected and passing through an absorptive media. Identified in the drawing is first reflective wall 109a with first reflective face 108a thereon and covered by first absorptive media 134a. Second reflective wall 115a has second reflective face 114a thereon which is covered by second absorptive media 136a. Third reflective wall 121a has third reflective face 120a thereon and is covered by third absorptive media 138a. Window 128a extends through the corresponding exposure wall and defines first exposure tab 130a and second exposure tab 132a. In this embodiment, each of the exposure and reflective walls are extended along Axis Z which here is illustrated as straight. In alternative embodiments, Axis Z may be curvilinear resulting in non-planar reflection chamber surfaces.

Figure 6:
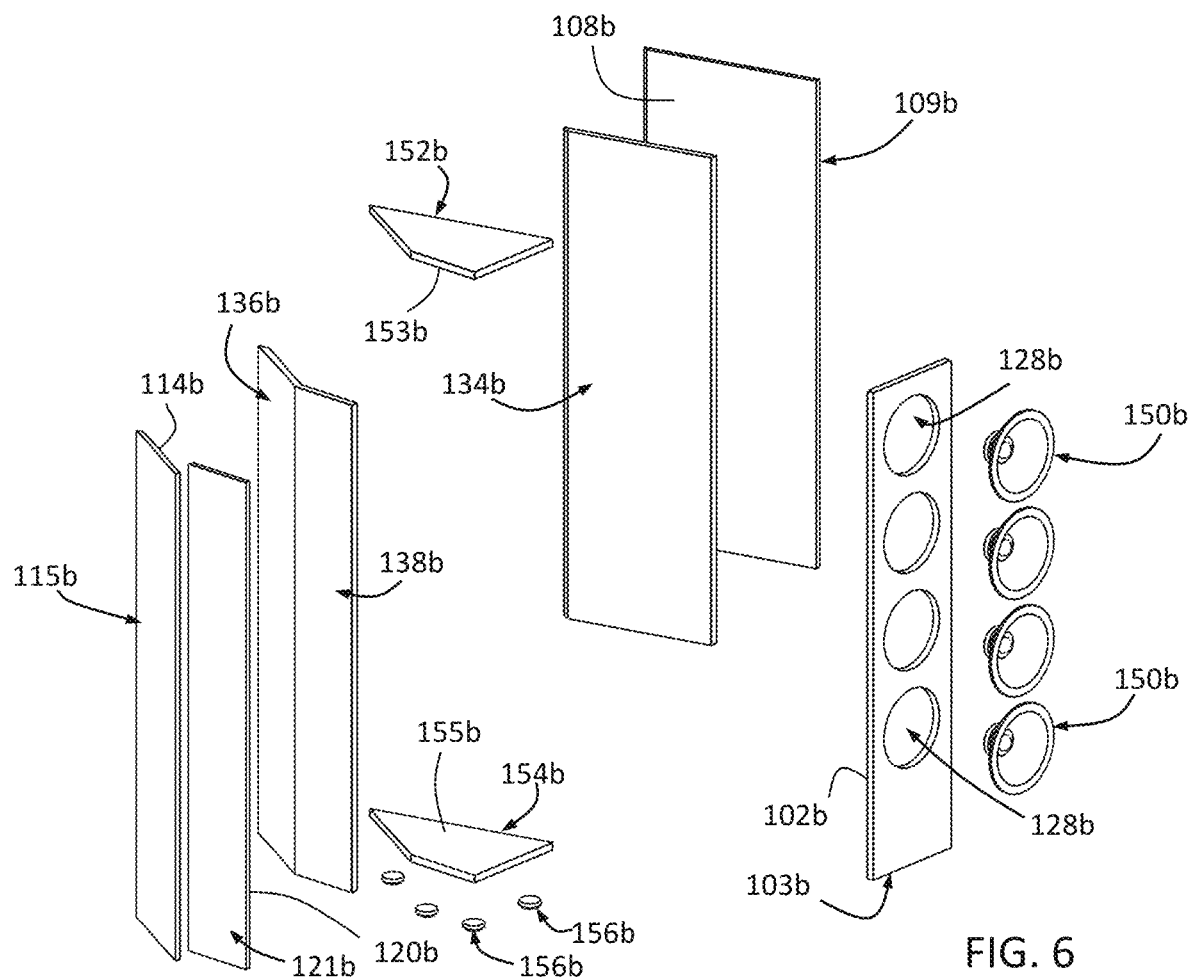
FIG. 6 depicts an exploded view of a prime polygon reflector in the form of an audio speaker according to one or more embodiments shown and described herein.
Figure 7A:
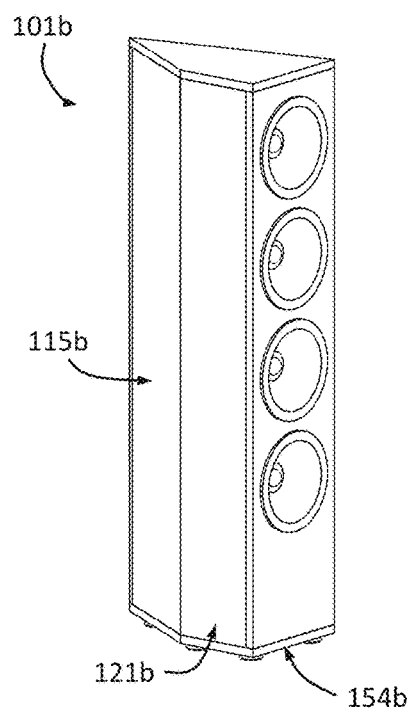
FIG. 7a depicts first side perspective view of the audio speaker of FIG. 6 according to one or more embodiments shown and described herein.
Figure 7B:
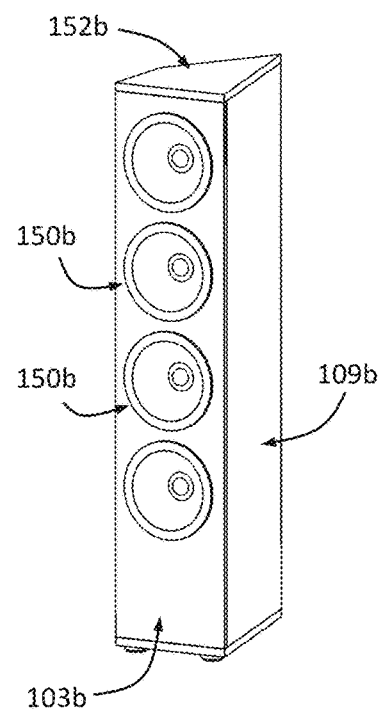
FIG. 7b depicts a second side perspective view of the audio speaker of FIG. 6 according to one or more embodiments shown and described herein.
Figure 7C:
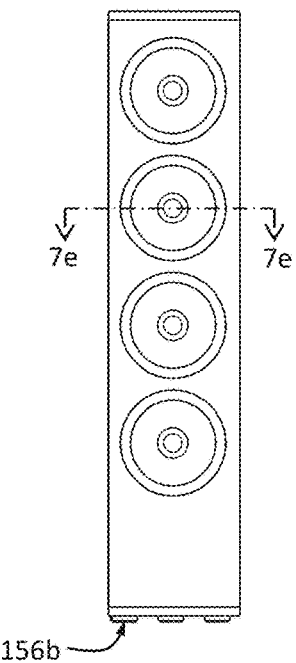
FIG. 7c depicts a front view of the audio speaker of FIG. 6 according to one or more embodiments shown and described herein.
Figure 7D:
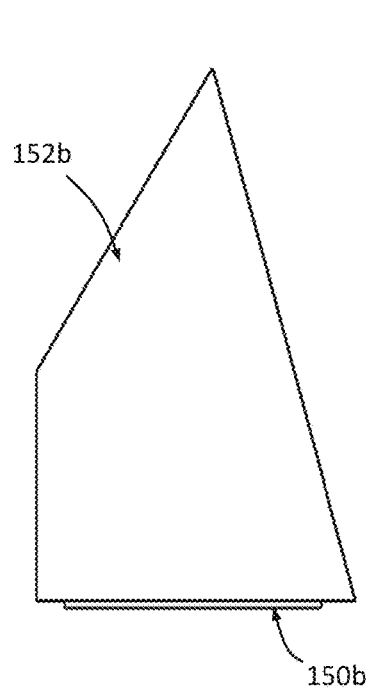
FIG. 7d depicts a top view of the audio speaker of FIG. 6 according to one or more embodiments shown and described herein.
Figure 7E:
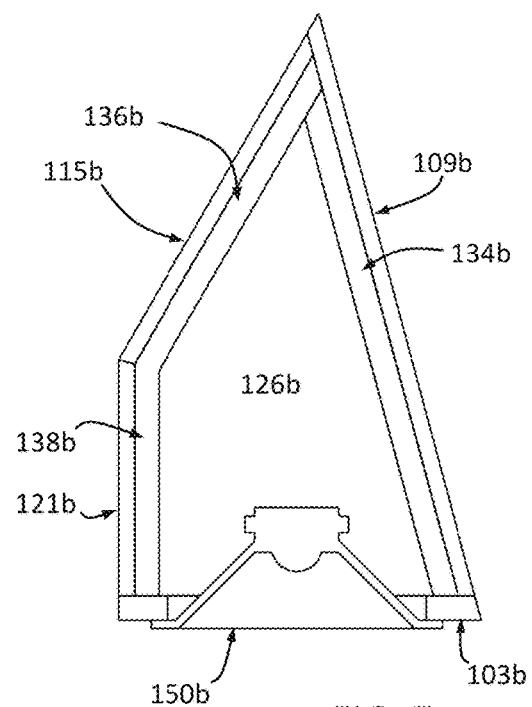
FIG. 7e depicts a cross-sectional view of the audio speaker of FIG. 6 according to one or more embodiments shown and described herein.

FIGS. 6 and 7a-7e illustrate use of an embodiment of a prime polygon reflector arrayed linearly and configured as a loud speaker cabinet. FIG. 6 is an exploded view of the speaker illustrated in FIG. 7a-7c. FIG. 7d (top view) and 7e (cross-sectional) are views illustrating the familiar prime polygon geometry. As illustrated in FIG. 6, this reflector comprises an exposure wall 103b with exposure face 102b thereon facing a reflection chamber. Windows 128b extend through exposure wall 103b. In this embodiment, window 128b is generally round and is spaced from first reflective wall 109b and third reflective wall 121b according to the previously defined geometric conditions H/6 and H/6.316011. Optimum placement is achieved when the effective cone diameter or characteristic dimension of the loudspeaker driver coincides with the prime polygon points of convergence. When this condition exists, energy input along the driver axis is forced through absorptive media a minimum of eight times before any reflective path could allow energy to escape the cabinet by exiting through the driver. Audio speaker 150b is mounted over each window 128b using fasteners. Third reflective wall 121b, second reflective wall 115b, and first reflective wall 109b with corresponding reflective faces thereon are sized and positioned to create a reflection chamber 126b therebetween. In this embodiment, each of the first, second, and third reflective faces 108b, 114b and 120b is covered by a respective first absorptive media 134b, second absorptive media 136b, and third absorptive media 138b. A first cap wall 152b (with first cap face 153b thereon) and a second cap wall 154b (with second cap face 155b thereon) enclose the ends of reflection chamber 126b and may also be covered in absorptive media. One or more feet are mounted to a bottom surface of second cap wall 154b to position the speaker cabinet on the floor. Fasteners, adhesives, tapes, dowels, and other methods may be used to join each reflective wall to form the speaker box and to hold the respective absorptive media to the corresponding reflective face. In some embodiments, faces directed toward reflection chamber 126b of first cap wall 152b, second cap wall 154b, and exposure wall 103b may also be covered with absorptive media. Operation of a prime polygon reflector is primarily dependent on the positioning of the exposure faces and reflective faces with respect to each other. Therefore, substantial changes to surfaces outside the reflection chamber may be done in various applications for cosmetic reasons thereby changing the outward appearance of the prime polygon reflector without affecting performance.

Figure 8:
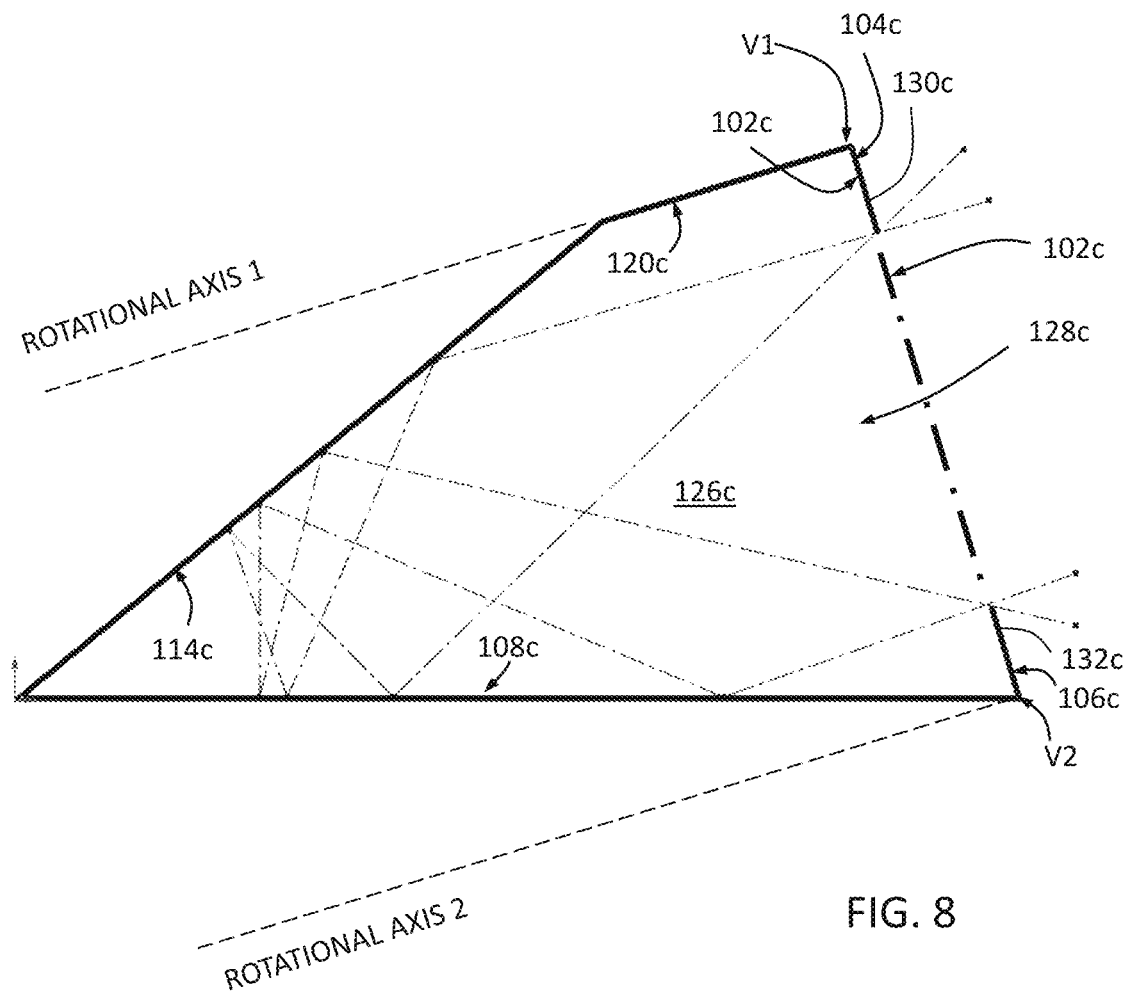
FIG. 8 depicts Rotational Axis 1 and Rotational Axis 2 around which the prime polygon geometry may be rotated for creation of two types of revolved (non-polarized) prime polygon reflectors according to one or more embodiments shown and described herein.
Figure 9A:
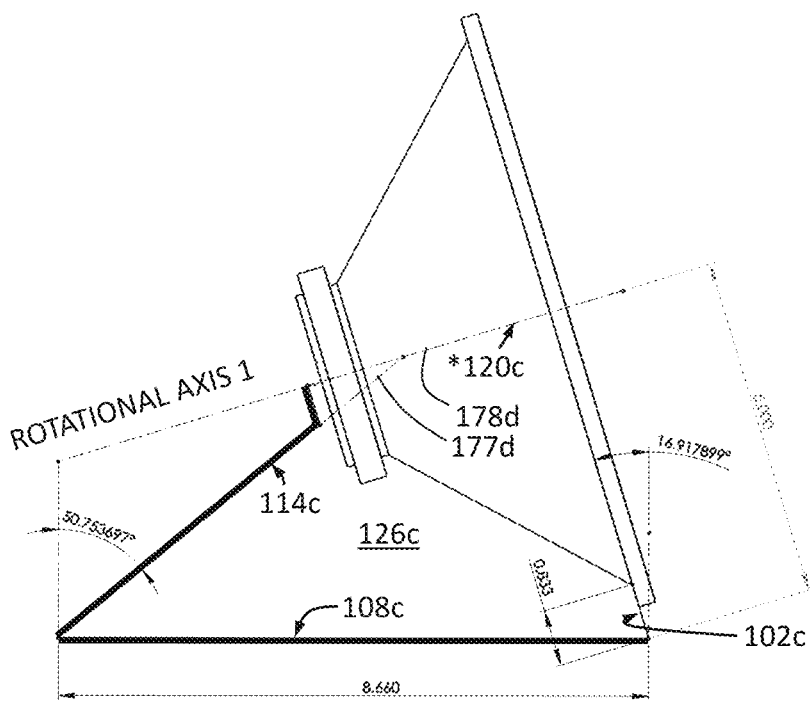
FIG. 9a depicts a line drawing of prime polygon reflector geometry for rotation about Rotational Axis 1 in a speaker box application according to one or more embodiments shown and described herein.
Figure 10A:
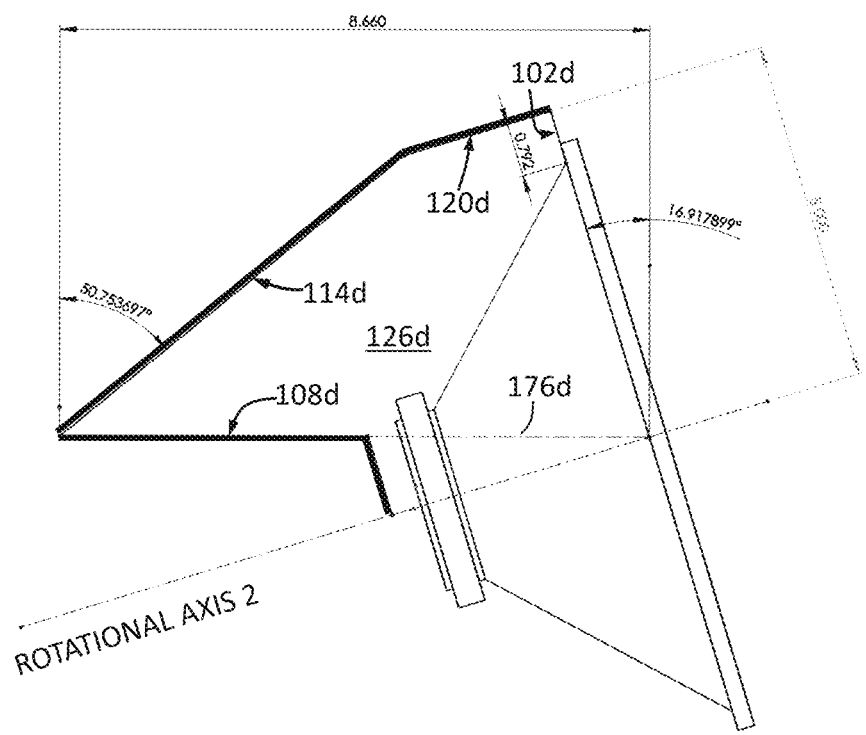
FIG. 10a depicts a line drawing of prime polygon reflector geometry for rotation about rotational axis 2 in a speaker box application according to one or more embodiments shown and described herein.
Figure 9B:
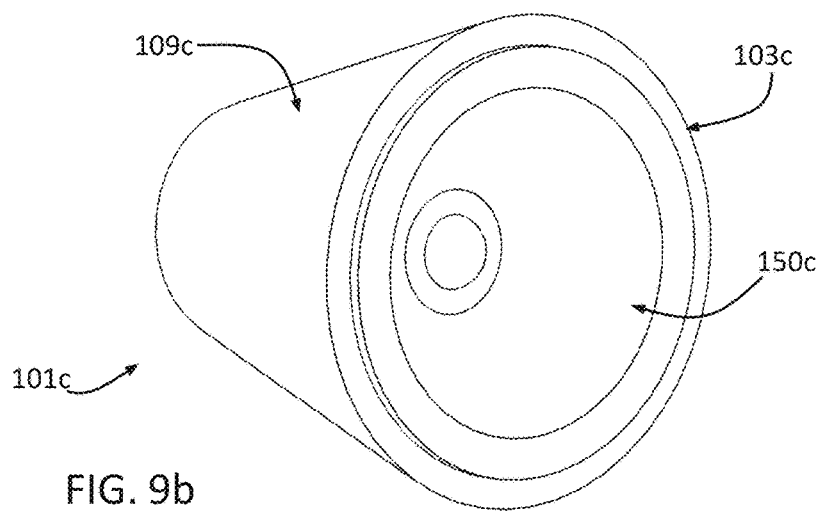
FIG. 9b depicts a front perspective view of a prime polygon reflector with speaker created from rotation about rotation axis 1 as illustrated in FIG. 9a according to one or more embodiments shown and described herein.
Figure 9C:
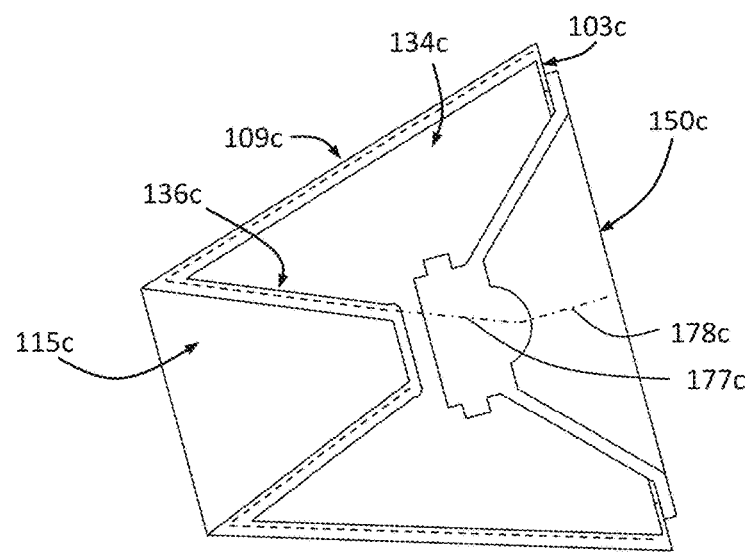
FIG. 9c depicts a cross-sectional view of the prime polygon reflector with loud speaker driver depicted in FIG. 9b with a second reflective reference and third reflective reference representing some of the truncated portions according to one or more embodiments shown and described herein.
Figure 9D:
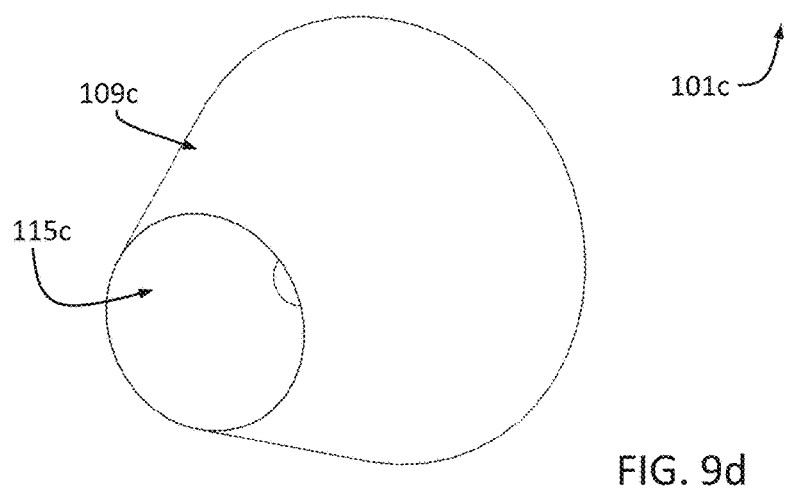
FIG. 9d depicts a rear perspective view of the prime polygon reflector depicted in FIG. 9b according to one or more embodiments shown and described herein.
Figure 9E:
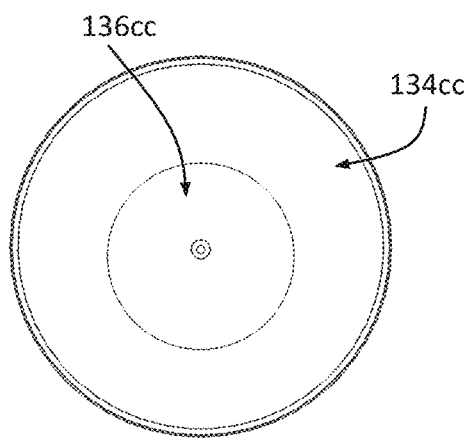
FIG. 9e depicts a front view of a revolved prime polygon reflector created by rotation about Rotational Axis 1 according to one or more embodiments shown and described herein.
Figure 9F:
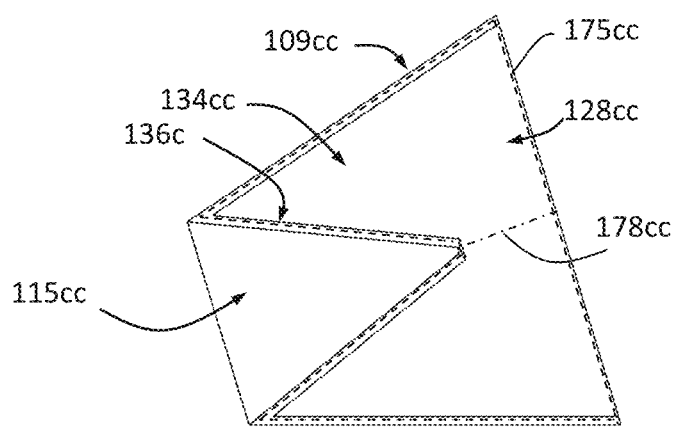
FIG. 9f depicts a cross-sectional view of the revolved prime polygon reflector of FIG. 9e according to one or more embodiments shown and described herein.
Figure 10B:
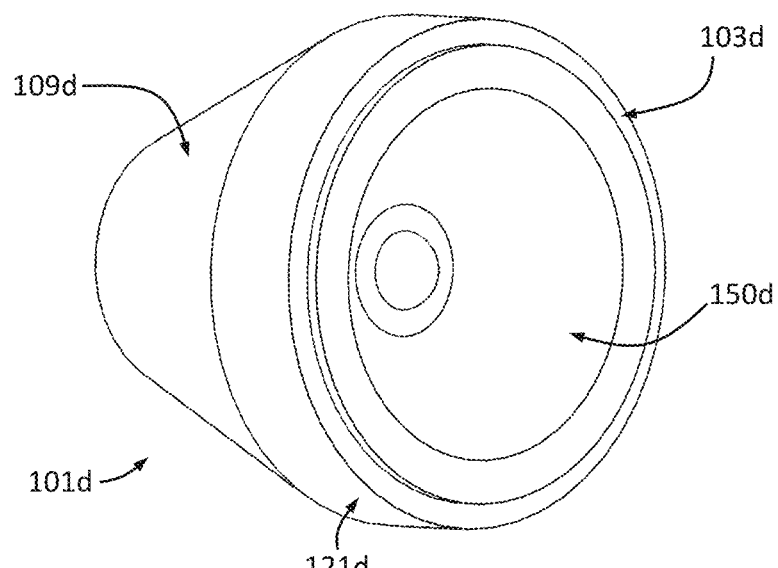
FIG. 10b depicts a front perspective view of a prime polygon reflector with speaker created from rotation about rotation axis 2 as illustrated in FIG. 10a according to one or more embodiments shown and described herein.
Figure 10C:
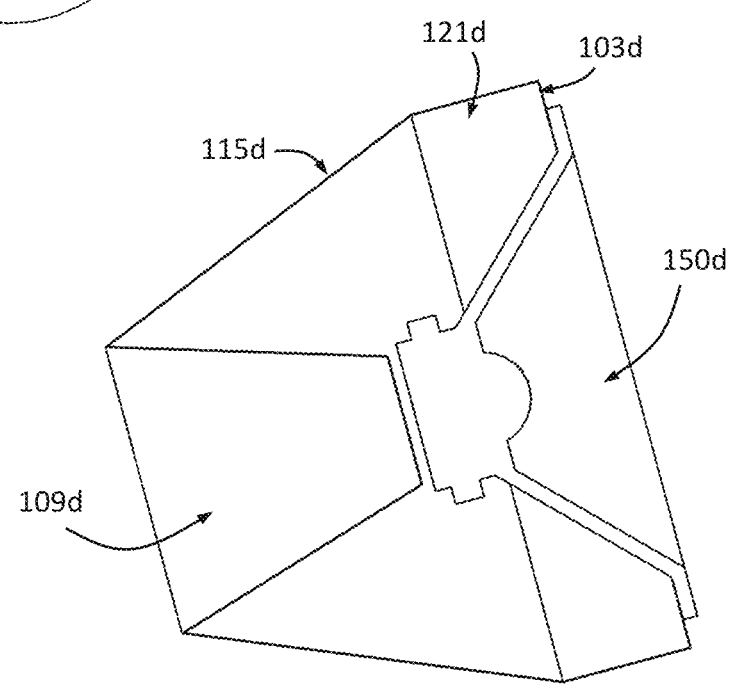
FIG. 10c depicts a cross-sectional view of the prime polygon reflector with loud speaker driver depicted in FIG. 10b according to one or more embodiments shown and described herein.
Figure 10D:
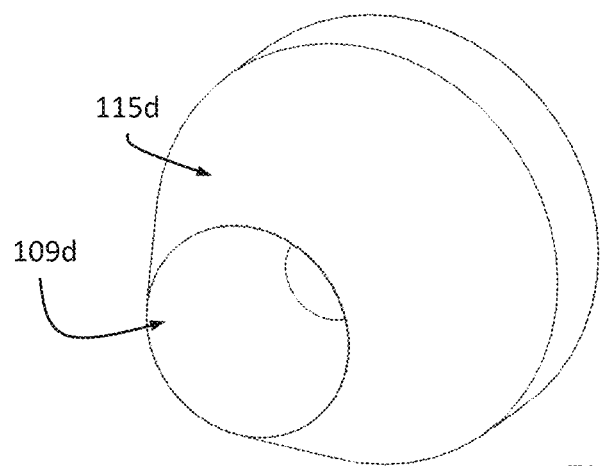
FIG. 10d depicts a rear perspective view of the prime polygon reflector depicted in FIG. 10b according to one or more embodiments shown and described herein.
Figure 10E:
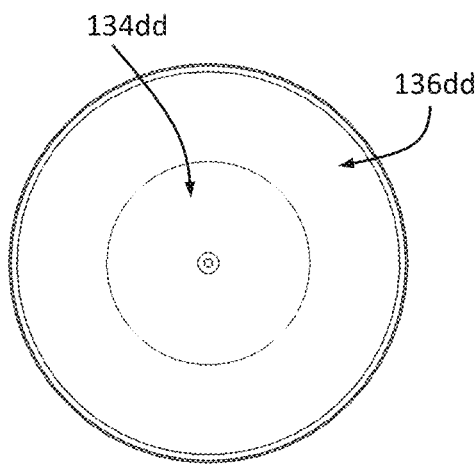
FIG. 10e depicts a front view of a revolved non-polarized prime polygon reflector created by rotation about Rotational Axis 2 according to one or more embodiments shown and described herein.
Figure 10F:
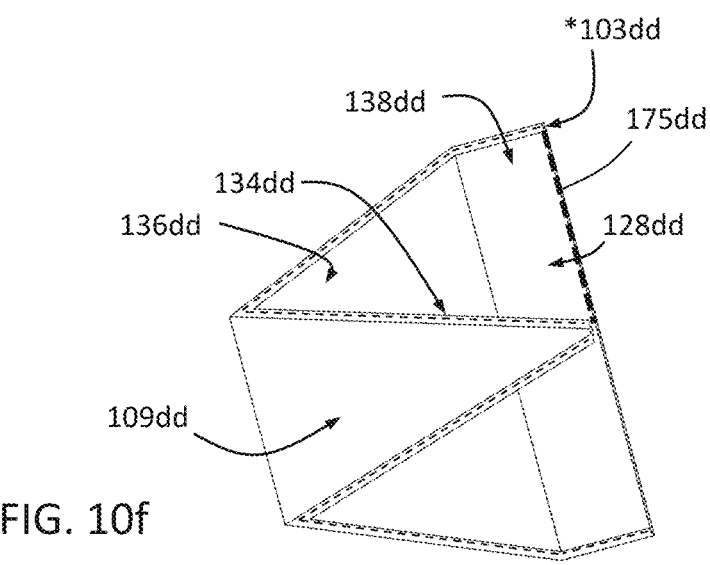
FIG. 10f depicts a cross-sectional view of the revolved prime polygon reflector of FIG. 10e according to one or more embodiments shown and described herein.

FIG. 8 illustrates prime polygon reflector geometry and introduces Rotational Axis 1 which is positioned orthogonal to exposure face 102c at V1 located at first end 104c of exposure face 102c and extends coincident with third reflective face 120c. FIG. 8 also introduces Rotational Axis 2 which is also orthogonal to exposure face 102c at V2 located at second end 106c of exposure face 102c. Therefore, Rotational Axis 2 is parallel to third reflective face 120c and Rotational Axis 1 and Rotational Axis 2 are spaced by a distance H. When the prime polygon geometry is revolved about Rotation Axis 1 or Rotational Axis 2, revolved configurations of the prime polygon reflector are produced. For example, FIG. 9a illustrates one embodiment of the geometry that may be used to create a revolved speaker box when revolved about Rotational Axis 1. FIGS. 9b, 9c, and 9d illustrate various views of a speaker box comprising this revolved geometry. As illustrated in the cross-sectional view of FIG. 9c, portions of the geometry have been truncated in this embodiment thereby minimizing direct reflective surface area. As another example, FIG. 10a illustrates an embodiment of the geometry that may be used to create a revolved speaker box when revolved about Rotational Axis 2. Note in these examples, the exposure face has a length H (diameter in this case) of 10. FIGS. 10b, 10c, and 10d illustrate various views of a speaker box comprising this revolved geometry. As illustrated in the cross-sectional view of FIG. 10c, portions of the geometry have been truncated in this embodiment. Note that prime polygon reflectors formed by rotation about Rotational Axis 1 or Rotational Axis 2 results in consequent conical shape of the first reflective face and the second reflective face.

The geometric shapes illustrated in FIGS. 9b through 10g lend themselves to existing manufacturing, presswork, and molding operations, allowing circular exposure faces to be repeated and arrayed and therefore facilitating the absorptive gains of the lined prime polygon reflector to be applied to large surface areas.

Figure 9G:
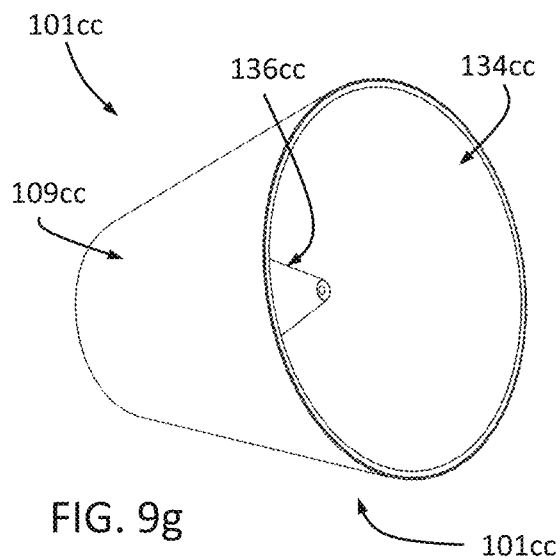
FIG. 9g depicts a front perspective view of the revolved prime polygon reflector of FIG. 9e according to one or more embodiments shown and described herein.
Figure 10G:
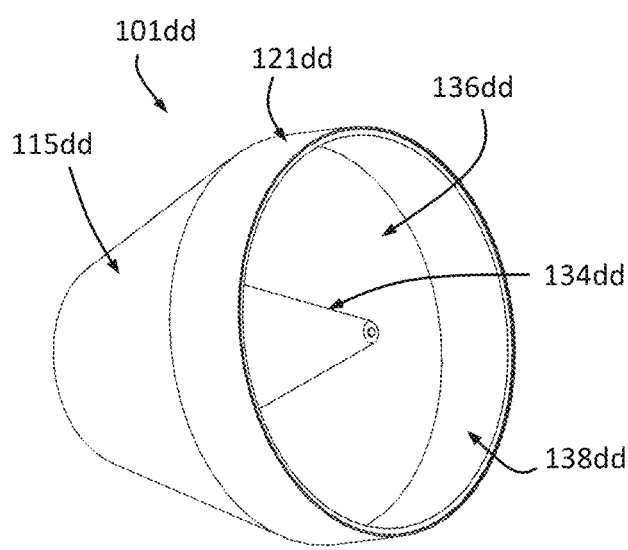
FIG. 10g depicts a front perspective view of the revolved prime polygon reflector of FIG. 10e according to one or more embodiments shown and described herein.
Figure 11A:
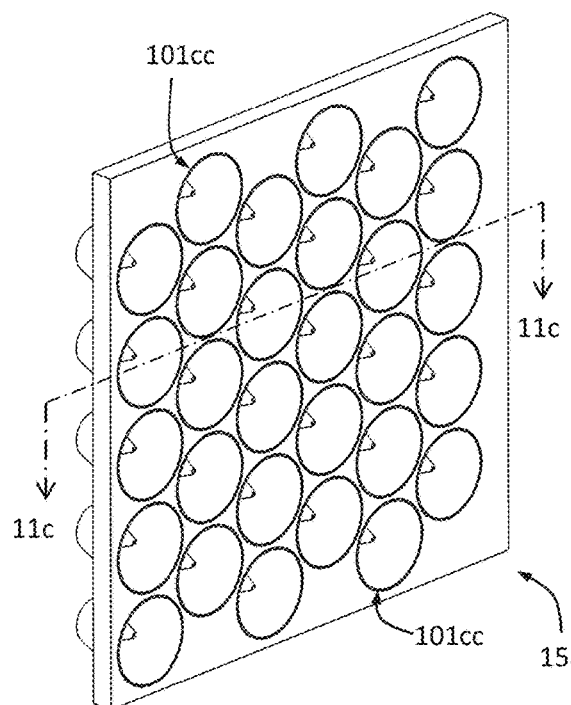
FIG. 11a depicts a front perspective view of an arrayed panel of prime polygon reflectors of FIG. 9g according to one or more embodiments shown and described herein.
Figure 11B:
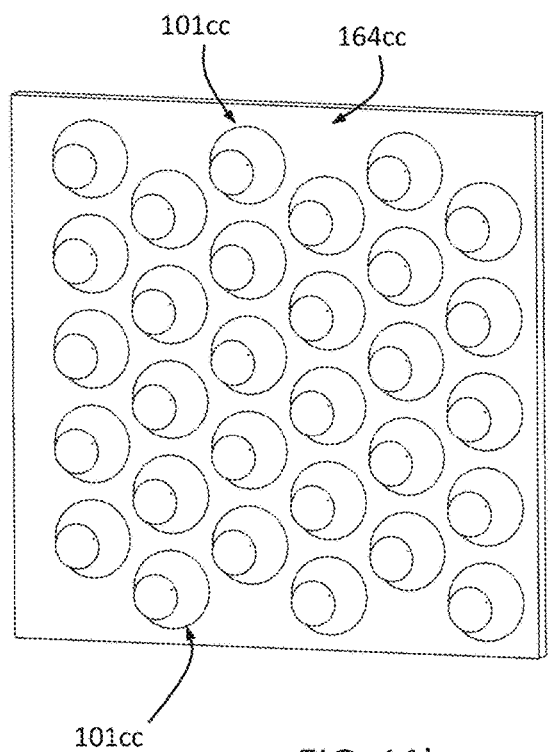
FIG. 11b depicts a rear perspective view of an arrayed panel of prime polygon reflectors of FIG. 9g according to one or more embodiments shown and described herein.
Figure 11C:
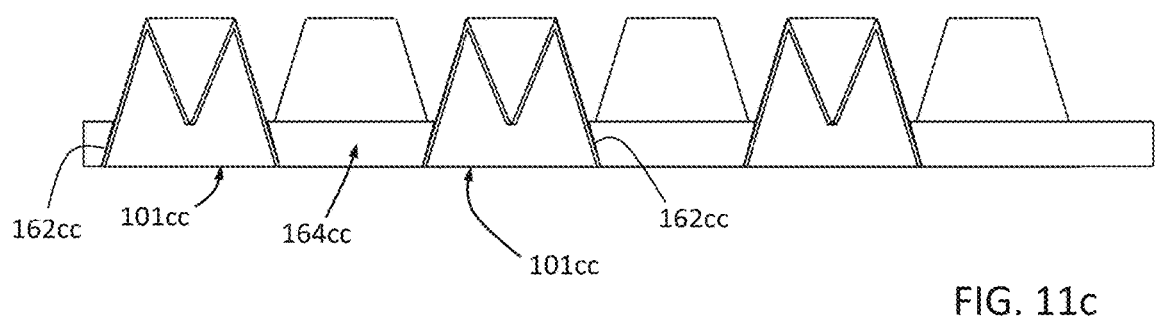
FIG. 11c depicts a cross sectional view of the arrayed panel of prime polygon reflectors of FIG. 11a according to one or more embodiments shown and described herein.
Figure 12A:
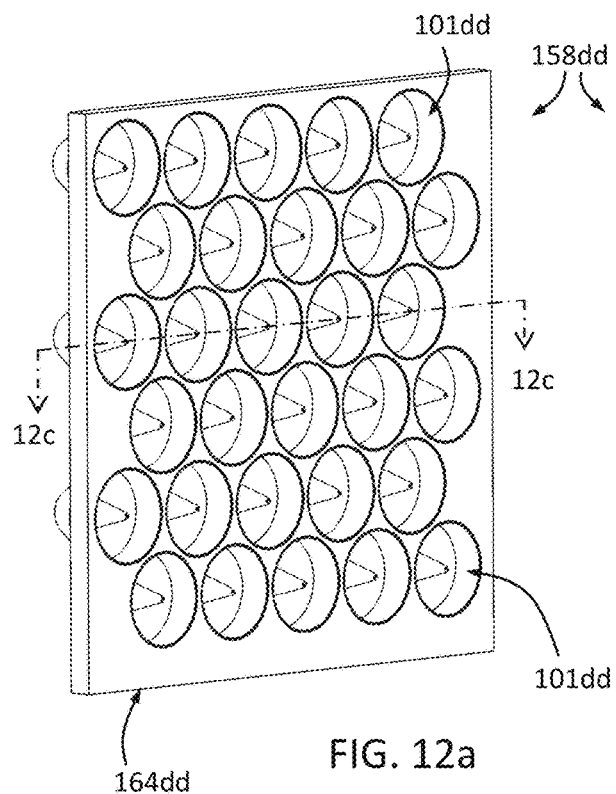
FIG. 12a depicts a front perspective view of an arrayed panel of prime polygon reflectors of FIG. 10g according to one or more embodiments shown and described herein.
Figure 12B:
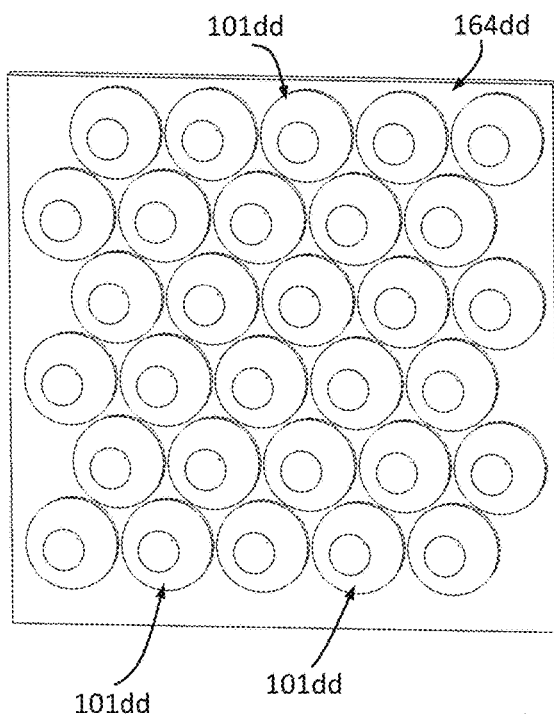
FIG. 12b depicts a rear perspective view of a an arrayed panel of prime polygon reflectors of FIG. 10g according to one or more embodiments shown and described herein.
Figure 12C:
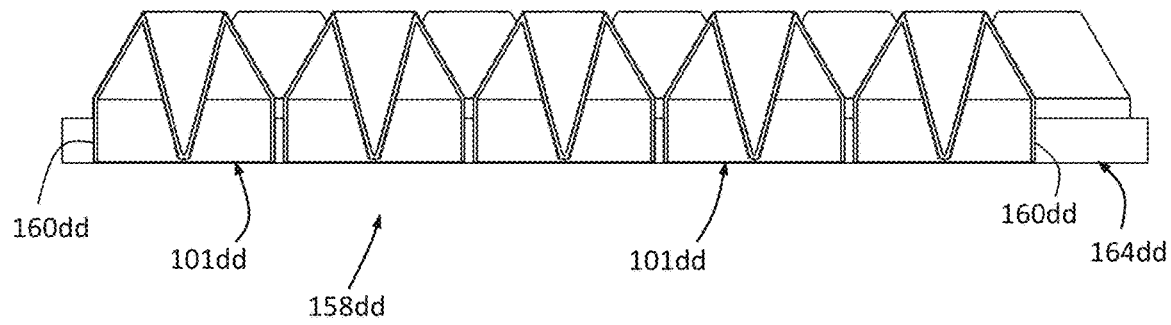
FIG. 12c depicts a cross sectional view of the arrayed panel of prime polygon reflectors of FIG. 12a according to one or more embodiments shown and described herein.

FIG. 11a-11c illustrate one embodiment of a prime polygon reflector array 158cc using the prime polygon reflectors 10cc illustrated in FIG. 9g. Here, an array panel 164cc about half the thickness of the exposure face diameter is perforated with a plurality of tapered bores 162cc sized to seat prime polygon reflector 101cc therein. Similarly, FIG. 12a-12c illustrate one embodiment of a prime polygon reflector array 158dd using the prime polygon reflectors 101dd illustrated in FIG. 10g. Here, an array panel 164dd about half the thickness of the exposure face diameter is perforated with a plurality of straight bores 160dd sized to seat prime polygon reflector 101dd therein. Preferably the prime polygon reflectors are fixed in place using adhesives, welded, etc.

Because the prime polygon is scalable, and the exposure face dimension is selected by the user or designer, there is a great deal of flexibility in being able to optimize the prime polygon reflector based on the wavelengths of energy to be absorbed and the structural design requirements of the application. Prime polygon reflectors 101cc and 101dd used in prime polygon reflector arrays 158cc, 158dd illustrated in FIGS. 11a-11c and FIGS. 12a-12c provide an open, circular exposure face that permits absorptive media to be applied by a variety of methods. To maximize absorption, panel surfaces between exposure faces may also be coated. Spraying, dipping, or even laying panels flat and pouring liquid media can produce completely filled profiles with a smooth surface finish.

Figure 15:
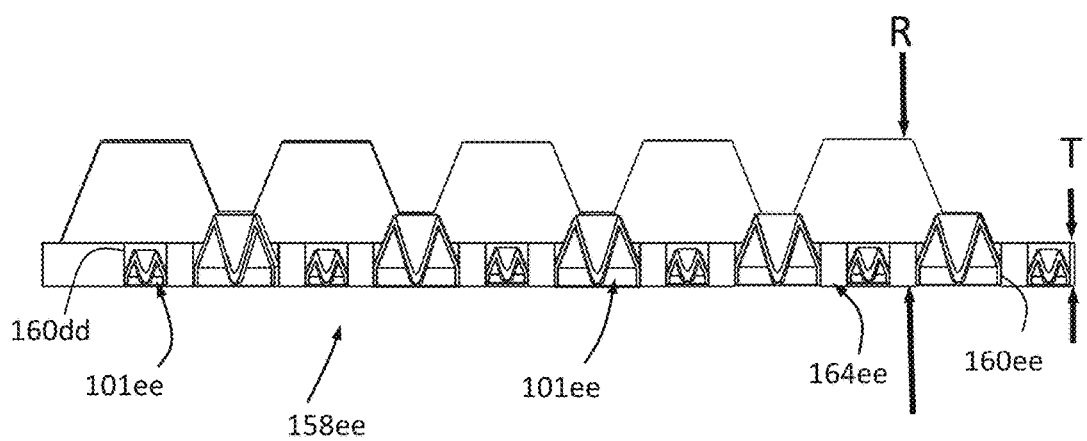
FIG. 15 depicts a cross-sectional view of the arrayed panel of multi-sized prime polygon reflectors of FIG. 13 according to one or more embodiments shown and described herein.

As illustrated in the FIG. 11a-11c embodiment, prime polygon reflectors 101cc are seated within a tapered bore 162cc extending at least partially into array panel 164cc. Similarly, and as illustrated in the FIG. 12a-12c embodiment, prime polygon reflectors 101dd are seated within a straight bore 160cc extending at least partially into array panel 164dd. As illustrated here, the bores are configured as tapered or straight, however one skilled in the art will recognize that other relationships exists for a prime polygon reflector to be seated within an array panel. In addition, the thickness of an array panel may vary. For example, as illustrated in FIG. 15, the array panel thickness T may be greater than, less than, or equal to a particular prime polygon reflector depth R. As further noted in FIG. 15, the larger prime polygon reflectors have a reflector depth R that is greater than the panel thickness T whereas the smaller prime polygon reflectors have a reflector depth T that is smaller than the panel thickness T. In alternative embodiments, the array panel thickness T may be sufficiently thick to also serve as structural support for a structure such as a building, water vessel such as a ship, or aircraft. In this embodiment, array panel 164ee comprises a front face 166ee, a rear face 168ee, and one or more end faces 170ee. When an array panel is configured to also provide structural support, the panel thickness T is typically greater than reflector depth R. In this case, bores such as straight bore 160dd and tapered bore 162cc do not extend though the rear face of the corresponding panel. In some embodiments, an array panel may comprise one or more fastening bores to house fasteners, hooks, wire, rope or other device for securing a prime polygon reflector array in a predetermined position to a wall or other structure.

Figure 13:
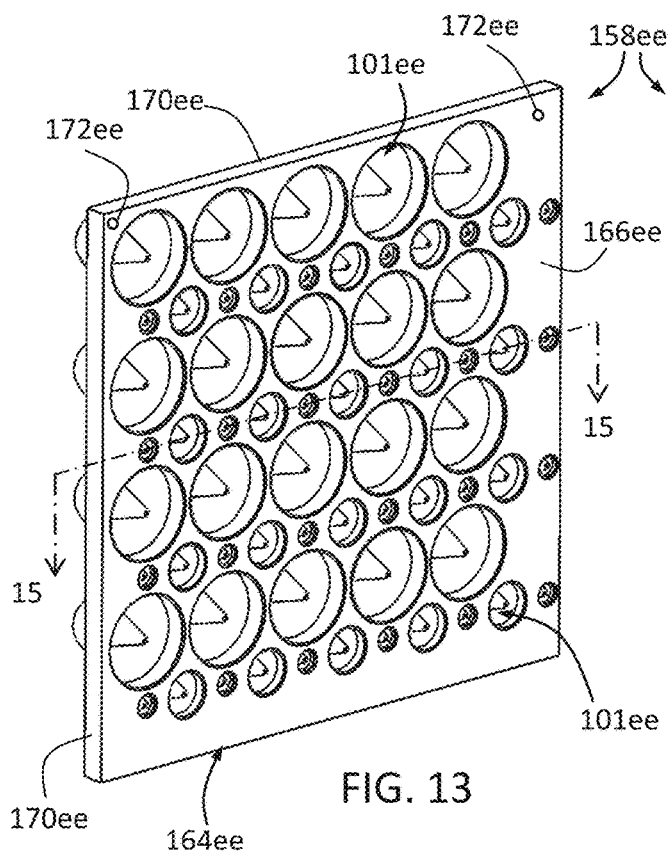
FIG. 13 depicts a front perspective view of an arrayed panel of multi-sized prime polygon reflectors according to one or more embodiments shown and described herein.
Figure 14:
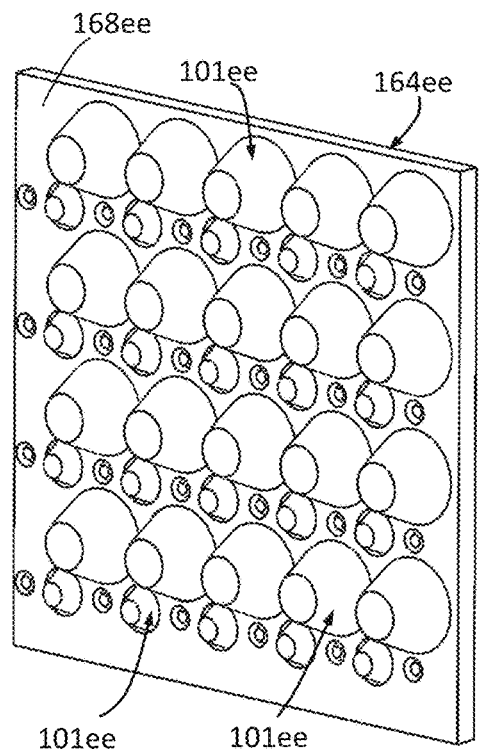
FIG. 14 depicts a rear perspective view of the arrayed panel of multi-sized prime polygon reflectors of FIG. 13 according to one or more embodiments shown and described herein.

FIG. 13-15 illustrate one embodiment of a prime polygon reflector array 158ee using prime polygon reflectors 101ee of various sizes of the type illustrated in FIG. 10g. Here, an array panel 164ee about half the thickness of the exposure face diameter is perforated with a plurality of straight bores 160ee sized to seat prime polygon reflector 101ee therein. Preferably the prime polygon reflectors are fixed in place using adhesives, welded, etc. In alternative embodiments, an array panel is perforated with tapered bores of various diameters to seat various sized prime polygon reflectors of the type illustrated in FIG. 9g. In yet another alternative embodiment, an array panel is perforated with a combination of tapered and straight bores for seating both types of FIG. 9g and 10g style prime polygon reflectors. Again, these various embodiments may be configured to comprise prime polygon reflectors of a single size or a plurality of sizes.

FIG. 16 illustrates yet another example of a prime polygon reflector array 158f. This configuration illustrates a non-polarized array of prime polygon reflectors useful for ambient noise control as might be encountered where frequency and location of noise vary or for circularly polarized energy source. In this embodiment, the prime polygon reflectors are imprinted directly in array panel 164f as opposed to seated in bores as illustrated in FIG. 15 and in other Figures. As illustrated, array panel 164f comprises prime polygon reflectors of a range of distinct diameters. For example, the array may include one or more first prime polygon reflector 180f of a given diameter X, and any combination of one or more progressively smaller: second prime polygon reflector 182f, third prime polygon reflector 184f, fourth prime polygon reflector 186f, fifth prime polygon reflector 188f, sixth prime polygon reflector 190f, seventh prime polygon reflector 192f and so on. Absorption characteristics are a function of prime polygon reflector diameter and energy wavelength. Varying size of individual reflectors within a single array provides an absorption bandwidth that is tunable by the designer. As evident from FIG. 16, the combination of prime polygon reflector sizes also assists in minimizing the amount of flat surfaces between adjacent prime polygon reflectors and thus reduces the incidence of producing inverted waveform reflections, improving the effectiveness of the prime polygon reflector array. In each of these embodiments, the prime polygon reflectors are covered with an absorptive medium as previous illustrated.

In some embodiments, a plurality of prime polygon reflector arrays are arranged at their end faces to form a larger surface areas as might be needed for example in a concert hall or airport terminal to dampen ambient noise. As illustrated in FIGS. 17-19, two or more prime polygon reflector arrays 158f (illustrated with absorptive media removed) are positioned adjacent each other at their ends. The prime polygon reflector arrays 158f may be fastened, glued, hung, or otherwise fixed to a structure using devices known in the art such as structural anchors, screws or adhesives. In some embodiments, a plurality of panel frames 194f may be positioned as illustrated in FIG. 19. Here, panel frame 194f comprises one or more end struts 196f that are fastened to a structure such as a wall using frame fasteners 200f which may be in the form of screws as illustrated in FIG. 19a. The end struts 196f comprise a base rib 204f having fastener holes with a panel rib 206f extending from the base rib. In some embodiments, an intermediate strut 198f is positioned between adjacent prime polygon reflector arrays 158f. End struts 196f and intermediate strut 198f are preferably arranged and define a complementary panel cavity 212f for seating a prime polygon reflector array 158f therein. Panel retainers 202f comprise a fixation face 208f and a rib channel 210f. Rib channel 210f is configured to engage panel rib 206f to fixate a prime polygon reflector array in position while fixation face 208f secures against front face 166f as illustrated in FIGS. 17 and 18. Panel anchorage, framing, and retention can take many forms depending on the application. As an example, larger arrays might utilize standard structural shapes such as angle, T, and C channel section.

Figure 20:
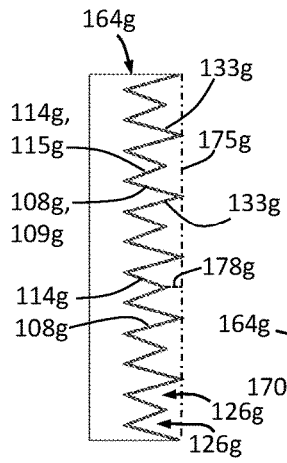
FIG. 20 is an end view of a vertically polarized prime polygon absorption panel for single wavelength radar according to one or more embodiments shown and described herein.
Figure 21:
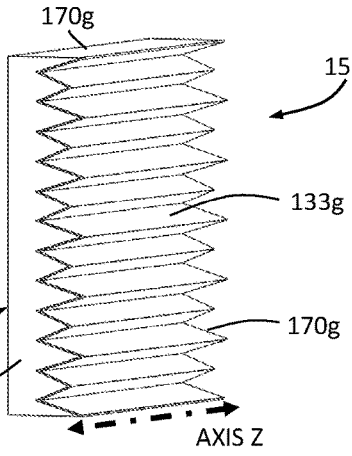
FIG. 21 is a perspective view of the vertically polarized prime polygon absorption panel of FIG. 20 wherein horizontal or angular polarization can be achieved by rotation of reflective faces or arrayed panels.

In yet another embodiment, a prime polygon reflector array 158g is configured as a vertically polarized prime polygon absorption panel for absorption of single wavelength radar. FIGS. 20 and 21 illustrate a side and a perspective view of this type of panel based on a linear cross sectional geometry of the prime polygon reflector illustrated in FIG. 9F. In this embodiment, disposed on a front side of prime polygon reflector array 158g is a plurality of first reflective faces 108g on first reflective walls 109g, and a plurality of second reflective faces 114g on second reflective walls 115g which extend from opposed sides (end faces 170g) along axis Z. A radio frequency (RF)/radar absorptive media 133g covers first reflective face 108g and second reflective face 114g as illustrated in FIGS. 20 and 21. Peaks of reflective surfaces are also covered with absorptive media to eliminate reflection at these locations.

Figure 21B:
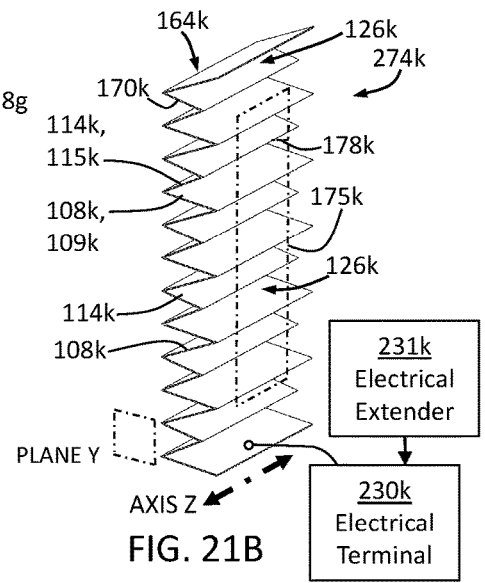
FIG. 21B is a perspective view of a truncated prime polygon reflector assembly further illustrated with optional electrical terminal.

FIG. 21B is a perspective view of a truncated prime polygon reflector assembly (TPPRA) 274k. Like all prime polygon reflectors disclosed herein, these truncated prime polygon reflector assemblies utilize the prime polygon geometry described earlier in this document but they are absent of absorptive media (although the absorptive media can be utilized as an option). Here the TPPRA is depicted with an optional electrical terminal 230k that provides a point of electrical connection with the reflector assembly. This electrical connection (i.e., a screw threaded into the TPPRA) can be utilized on the various reflector assemblies disclosed herein that comprise a conductive material. In this embodiment, the truncated prime polygon reflector assembly 274k is a pre-stamped panel of thin, reflective substrate although other manufacturing techniques can be utilized such as hydroforming to garner the required geometry. Although not limited to these uses, it is operable for installation between wall studs, floor joists, rafters or truss members intended to fit standard commercial and residential buildings. Truncated prime polygon reflector assemblies of this type are pre-formed conductive panels that can be used to replace flat conductive panels used in construction of traditional shield enclosures.

Figure 21C:
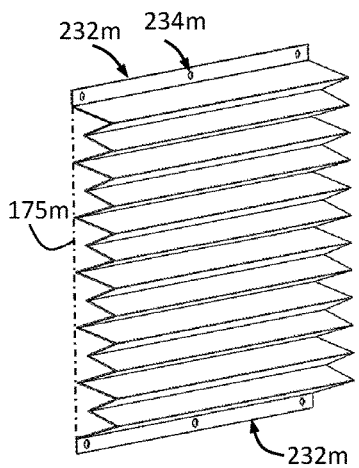
FIG. 21C is a perspective view of a truncated prime polygon reflector assembly with an end mounting flange.

FIG. 21C is a perspective view of a truncated prime polygon reflector assembly 274m like that seen in FIG. 21B but with an end mounting flange 232m that extends along at least a portion of one or more ends of the absorption panel. The end mounting flange can include a mounting hole 234m for receiving a fastener. The mounting flanges are orientated to secure the absorption panel flat against an adjoining generally flat surface and the TPPRA is operable for installation between wall studs, floor joists, rafters or truss members.

Figure 21D:
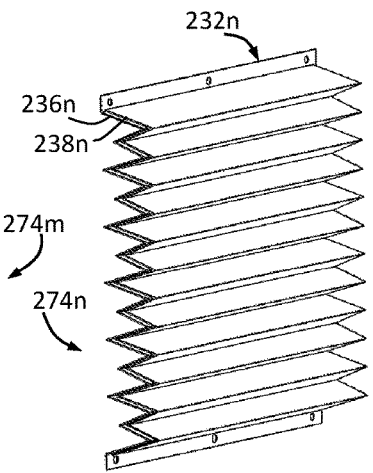
FIG. 21D is a perspective view of a truncated prime polygon reflector assembly with optional mounting flanges and with a reflective surface covering.

FIG. 21D is a perspective view of a truncated prime polygon reflector assembly 274n also with optional mounting flanges 232n. In this embodiment, the truncated prime polygon reflector assembly is pre-formed of a non-reflective substrate 236n such as a polymer. At least a portion or entire assembly is then dipped, sprayed, foil faced or by other means provided in its entirety with a reflective surface coating 238n. Low-cost examples would include injection molded or formed foam panels dipped or sprayed with reflective paint or coating.

Figure 21E:
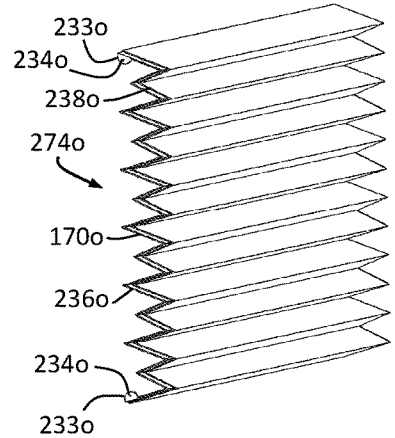
FIG. 21E is a perspective view of a truncated prime polygon reflector assembly with an optional side mounting flange and illustrated with a reflective surface covering.

FIG. 21E is a perspective view of a truncated prime polygon reflector assembly 274o with an optional side mounting flange 233o and again illustrated with a reflective surface covering 238o. These panels can alternatively be manufactured of reflective material such as a stamped steel for example.

Figure 21F:
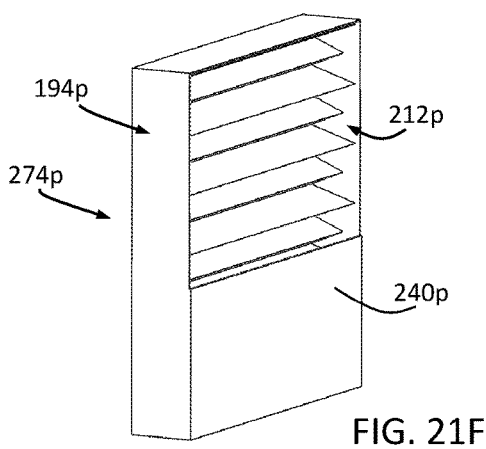
FIG. 21F is a perspective view of a truncated prime polygon reflector assembly within an enclosure with a portion of its facing removed to illustrate inside features.
Figure 21G:
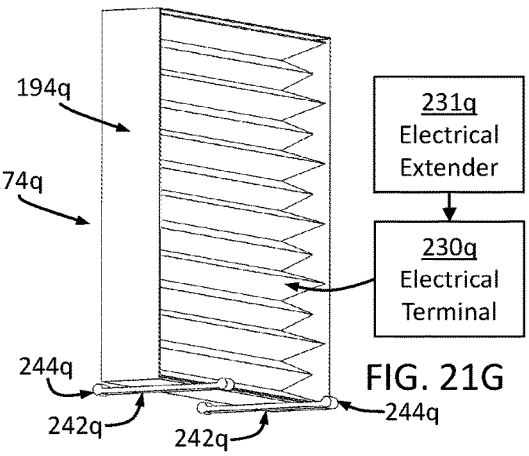
FIG. 21G is a perspective view of a truncated prime polygon reflector assembly within an enclosure with optional facing removed to illustrate inside features and with support features to make the panel self-standing.

FIG. 21F is a perspective view of a truncated prime polygon reflector assembly 274p that includes a panel frame. It is depicted here with a portion of its reflector facing 240p removed to illustrate reflecting features inside the panel cavity 212p which is defined by the panel frame 194p. In preferred embodiments, the panel frame is constructed of rigid materials adequate to support the reflector assembly located inside. The reflector facing 240p can comprise a variety of materials which may be non-reflective and frequently cosmetic in nature such as dyed woven materials to assist integration into the environment it is placed. In some instances, the chosen reflector facing will be weather resistant such as needed for outdoor use. The TPPRA in FIG. 21F can be mounted to walls, floor, ceiling, roof or other structures utilizing fasteners, brackets, or other means described herein or known in the art. Truncated prime polygon reflector assemblies can be portable and free standing with the assistance of support features such as depicted in FIG. 21G.

The support features can include a support base 242q, for example as depicted here in the form of an elongate leg. The support base can include a support toe 244q, for example as depicted here in the form of a wheel for portability or a leveling pod. The truncated prime polygon reflector assembly 274q depicted here is contained within an enclosure 194q with optional reflector facing removed to illustrate inside features. Truncated prime polygon reflector assemblies such as this, provide temporary preventative protection against invasions such as for example, Bluetooth eavesdropping during meetings or conferences. This, as well as other prime polygon reflector assemblies disclosed herein, can include an electrical terminal 230q for coupling with an electrical extender 231q. The electrical extender can be for example, in the form of a standard electric appliance cord and plug operable to couple with a ground conductor of a facility such as a hotel or restaurant conference room to further enhance wireless privacy during meetings or conferences. In some cases, the electrical extender can be used to drive a blocking waveform to the truncated prime polygon reflection assembly.

Figure 21H:
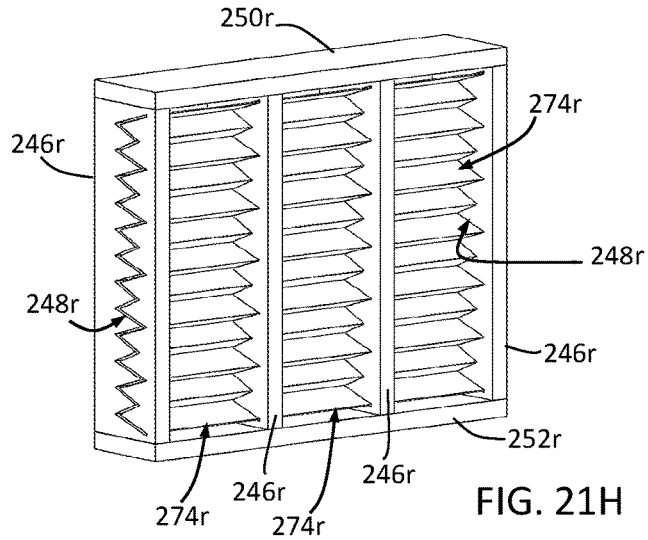
FIG. 21H is a perspective view of the framing of a wall comprising slotted studs and inserted truncated prime polygon reflector assemblies housed between the studs.

Truncated prime polygon reflector plates and/or truncated prime polygon reflector assemblies can be utilized in a pre-slotted enclosure or room framing members such as wall studs, joists, or rafters. Doing so, the shielding effectiveness of an enclosure is passively increased within the rejection band of the resulting truncated prime polygon reflector assembly. FIG. 21H depicts the framing of a wall comprising slotted studs 246r and a plurality of truncated prime polygon reflector assemblies 274r inserted into the prime polygon slots 248r where they are housed between the slotted studs. As illustrated here, the prime polygon slots 248r which generally replicate the prime polygon geometry, do not extend entirely through the stud, however, in other embodiments the slots can extend thru whereby the truncated prime polygon reflector assembly can abut each other and in some cases a single truncated prime polygon reflector assembly is of a length long enough to pass through a plurality of slotted studs. In this arrangement, the shielding effectiveness of an enclosure is passively increased within the rejection band of the truncated prime polygon reflector assembly. This passive increase remains functional independently of any shield enclosure ground and is not visible to a casual observer.

Figure 21K:
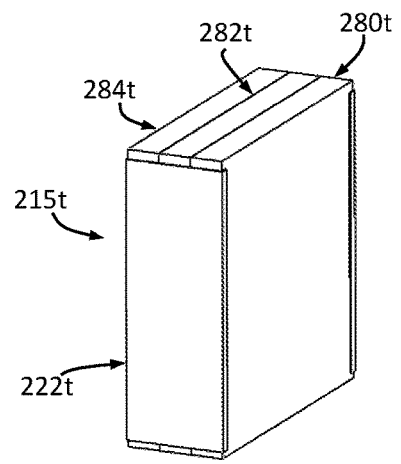
FIG. 21K is a perspective view of a truncated prime polygon reflector assembly comprising a plurality of TPPRAs having differing rejection bands.
Figure 21I:
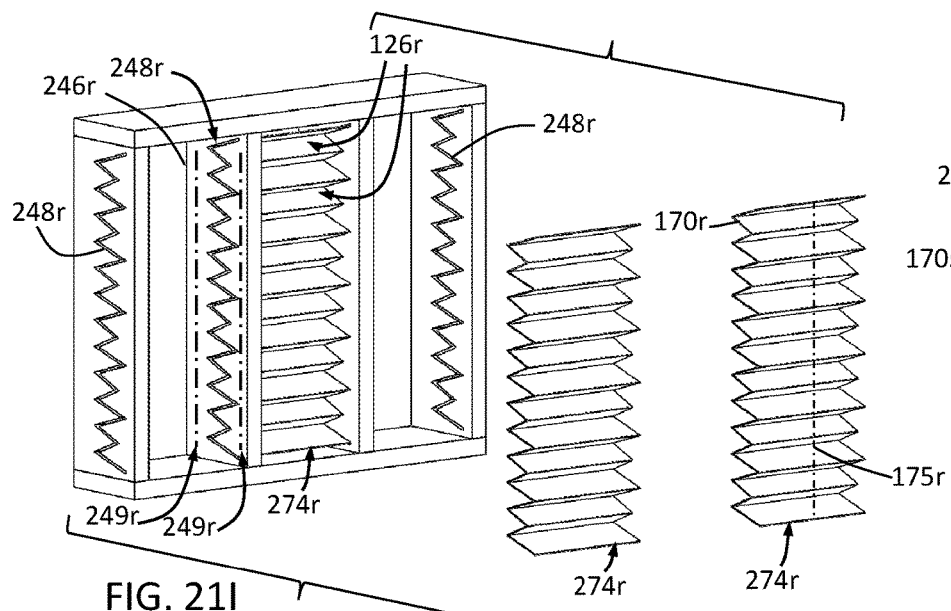
FIG. 21I is an exploded perspective view of the wall depicted in FIG. 21H.

FIG. 21I is an exploded perspective view of the wall depicted in FIG. 21H. However, it also illustrates where additional alternative prime polygon slots 249r can be cut into the slotted studs 246r. A single prime polygon slot 248r accommodates a single layer of truncated prime polygon reflector assembly 274r. However, a spaced second, third, and even fourth alternative polygon slot 249r (depicted here for location purposes only as dotted lines and does not represent prime polygon geometry) can be included on the slotted studs 246r for housing additional layers of truncated prime polygon reflector assemblies with each tuned to shield against a specified wavelength. A single layer prime polygon reflector assembly is effective against a single designated band, a two-layer effective for dual band, and three or more layers effective for broadband.

Figure 21J:
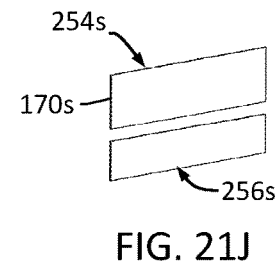
FIG. 21J is a perspective view of various sized reflector plates that can be utilized to construct a truncated prime polygon reflector assembly.

FIG. 21J is a perspective view of various sized reflector plates. The reflector plates are sized according to the prime polygon geometry and arranged at the specified angles to each other. The reflector plates can be utilized to construct a truncated prime polygon reflector assembly similar to 274r. Illustrated for example is a first reflector plate 254s and a second reflector plate 256s. As an alternative to stamping, the reflective elements (reflector plates) can alternatively be formed by organized arrangement of reflector plates by their insertion into pre-slotted inserts between existing framing members.

FIG. 21K is a perspective view of a truncated prime polygon reflector assembly group 215t comprising a plurality of TPPRAs (first TPPRA panel 280t, second TPPRA panel 282t, third TPPRA panel 284t) having differing rejection bands and are layered in a non-reflective perimeter framing 222t and fit to the exterior of an existing shield enclosure (such as illustrated in FIG. 21M) to provide supplemental broadband shielding that cannot be disabled by severing the enclosure ground.

Figure 21L:
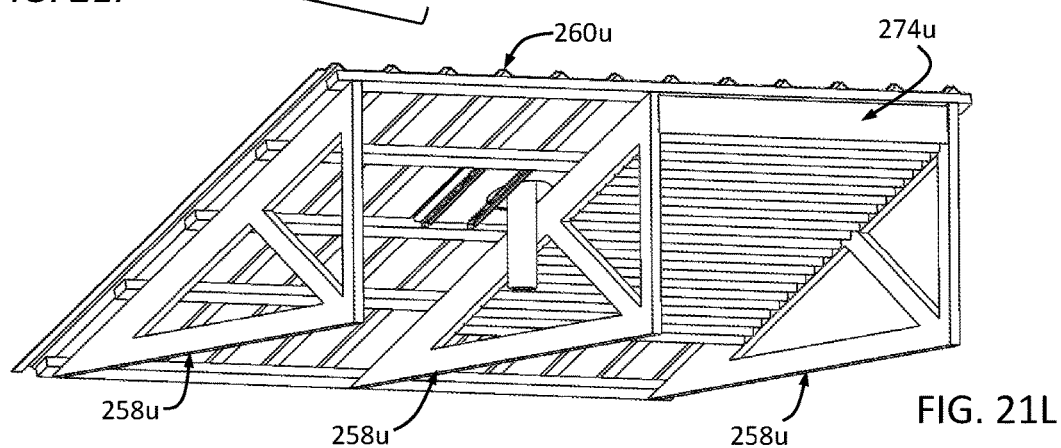
FIG. 21L is a perspective view of a truncated prime polygon reflector assembly installed between trusses in a roof.

FIG. 21L depicts a truncated prime polygon reflector assembly 274u as it might be installed between trusses 258u in a roof.

FIG. 21M is a cutaway perspective view of a room in a building with walls 268v. For the sake of example, the room may include telephone switches, data servers, and other types of sensitive electronic equipment 276v. In this arrangement, the room is shielded by an existing waveform shield enclosure 266v (depicted as partially cut-away) in addition to truncated prime polygon reflector assemblies 274v framed to the exterior of the existing waveform shield enclosure 266v. The prime polygon absorption panels provide an supplemental protection to the buildings existing waveform shield enclosure. This arrangement increases shielding effectiveness within the rejection band of the truncated prime polygon reflector assembly panel.

FIG. 21N is a cutaway perspective view of a building housing sensitive electronic equipment 276w wherein truncated prime polygon reflector assemblies 274w are positioned adjacent to interior surfaces of a shield enclosure 266w. The truncated prime polygon reflector assemblies 274w are non-conductively anchored to or adjacent to interior surfaces of a shield enclosure or shielded room having walls 268w. Although optional, in some embodiments, the truncated prime polygon reflector assemblies 274w are electrically connected to a signal conductor 270w of an electrical circuit via an electrical extender 231w to electrical terminal 230w. Provided with an appropriate ground, the signal conductor may be used for interior enclosure spectral monitoring, or can be used to radiate a jamming signal, initiated manually or as an output from an alarm system in response to a fault condition such as a detected loss of primary enclosure ground or detection of an intruder.

FIG. 21P is a cutaway view of a building utilizing truncated prime polygon reflector assemblies 274x passively installed against a building. In this embodiment, truncated prime polygon reflector assemblies 274x are installed as a passive means to reduce electromagnetic radiation exposure to occupants of buildings such as participants 264x meeting at a conference table 262x where high power cellular phone or other data transmission equipment 272x is sited on the rooftop of office or apartment buildings.

FIG. 21Q is a top view of a room with portable prime polygon absorption panels arranged to at least partially shield participants 264y meeting at a conference table 262y. The portable absorption panels are of the variety depicted previously as 274q.

In yet another embodiment, a prime polygon reflector array 158h is configured as a vertically polarized prime polygon absorption panel for absorption of single wavelength radar. FIGS. 22 and 23 illustrate a side and a perspective view of this type of panel based on the linear cross sectional geometry of the prime polygon reflector illustrated in FIG. 10f. A RF/radar absorptive media covering the reflective surfaces has been removed from the illustration. In this embodiment, disposed on a front side of prime polygon reflector array 158h is a plurality of first reflective faces 108h on first reflective walls 109h, and a plurality of second reflective faces 114h on second reflective walls 115h which extend from opposed sides (end faces 170h) along axis Z. A radio frequency (RF)/radar absorptive media 133h removed from the illustration covers first reflective face 108h and second reflective face 114h as illustrated previously in FIGS. 20 and 21.

In yet another embodiment, a prime polygon reflector array 158i is configured as a vertically polarized prime polygon absorption panel for absorption of single wavelength radar. FIGS. 24 and 25 illustrate a side and a perspective view of this type of panel based on the linear cross-sectional geometry of the prime polygon reflector illustrated in FIG. 8 with the first exposure tab 130c and second exposure tab 132c being truncated. A RF/radar absorptive media covering the reflective surfaces has been removed from the illustration. In this embodiment, disposed on a front side of prime polygon reflector array 158i is a plurality of first reflective faces 108i on first reflective walls 109i, and a plurality of second reflective faces 114i on second reflective walls 115i which extend from opposed sides (end faces 170i) along axis Z. A radio frequency (RF)/radar absorptive media 133i removed from the illustration covers first reflective face 108i and second reflective face 114i as illustrated previously in FIGS. 20 and 21.

Commercial examples of RF/radar absorptive media that may be used include but are not limited to: MWT Materials® W-500/501 Urethane, and MAST Technologies® Radar Absorbing Material (RAM).

In yet another example, a vertically polarized prime polygon reflector array assembly 214j (FIG. 29-30) is constructed for absorption of predetermined bandwidth radar. In this embodiment, a prime polygon reflector array assembly 214j is made from a plurality of individual array panels. As illustrated in FIG. 26-28, a panel assembly having dimension H can comprise a range of prime polygon reflector heights based on wavelength range (bandwidth) of a predetermined radar system. Formed in the front face 166j of each array panel are vertical geometric prime polygon reflector sections of the type illustrated in FIG. 9F, FIG. 10F, and/or truncated FIG. 8 of varying exposure face dimensions within a specified range. The finished array panel is then coated or otherwise treated with RF/radar absorbing media which is shown as removed in some views.

In this embodiment (FIG. 29-30), a three panel variation of a prime polygon reflector array assembly 214j is illustrated. Represented in FIGS. 26-28 are front views of a first array panel 216j, a second array panel 218j, and a third array panel 220j. Regions within the front face are labeled with FIG. 8, 9F, or 10F to reference the profile of the corresponding prime polygon reflector type used in that region. The prime polygon reflector array assembly 214j comprises a first array panel 216j, a second array panel 218j, and a third array panel 220j which are sandwiched and held in an assembly by fasteners or by use of a non-reflective perimeter framing 222j. More or less array panels may be used in a prime polygon reflector array assembly (i.e. fourth array panel, fifth array panel and so on). In some embodiments, the array panels are identical but rotated when stacked against each other to provide variation. In other embodiments, the array panels are non-identical.

Figure 29:
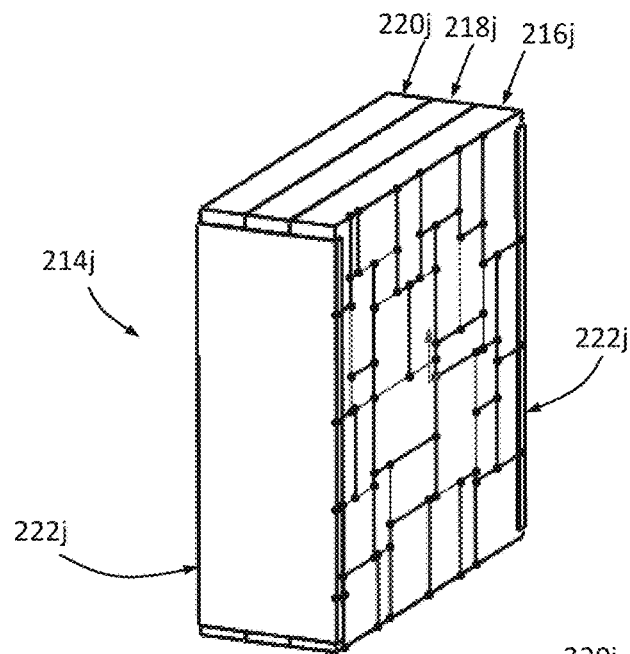
FIG. 29 is a perspective view of a custom absorption spectra created by the layering of the prime polygon reflector arrays of FIGS. 26-28 according to one or more embodiments shown and described herein.
Figure 30:
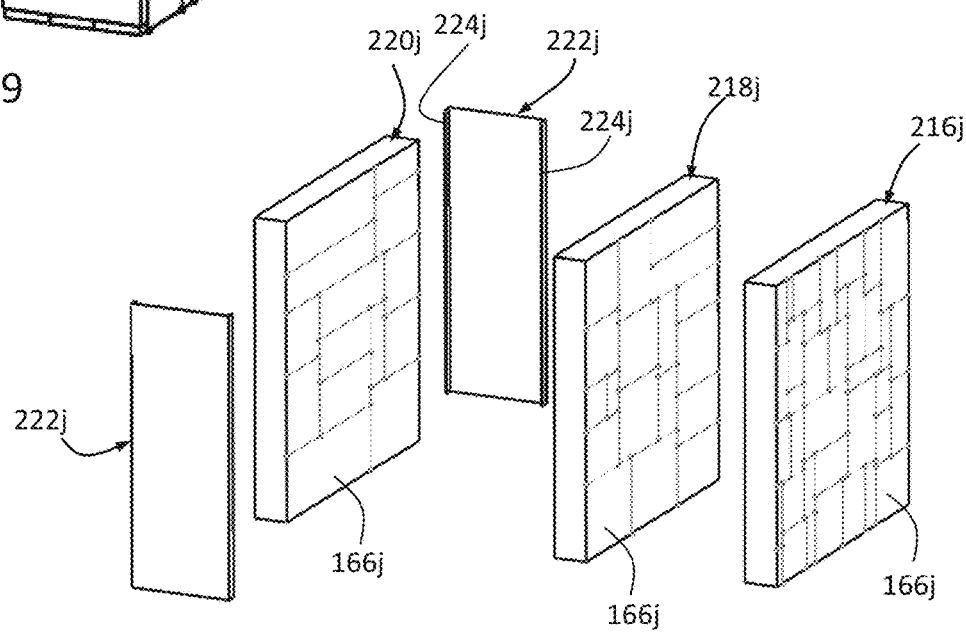
FIG. 30 is an exploded perspective view of the layered prime polygon reflector array of FIG. 29 according to one or more embodiments shown and described herein.
Figure 31:
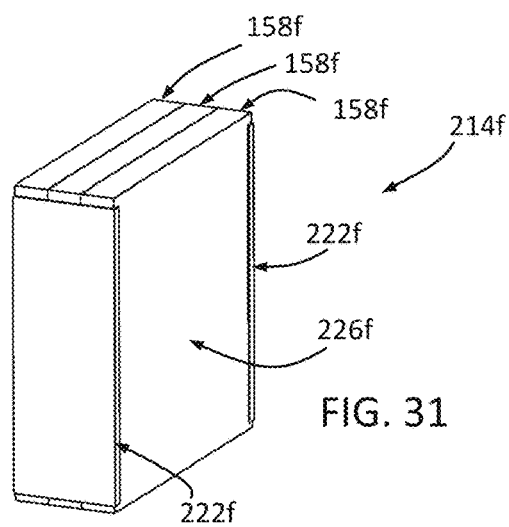
FIG. 31 is a perspective view of a custom absorption spectra created by layering of the prime polygon reflector array of FIG. 16 according to one or more embodiments shown and described herein.

A custom absorption spectra is produced by varying the exposure face Height H and layering a combination of array panels. In some embodiments, prime polygon reflectors are scribed in a front face 166j of an array panel by techniques such as machining, molding, stamping or die-forming into a thin reflective substrate. The illustrated panels in FIGS. 29-30 are shown with a smooth face after application of absorptive media. Similarly, as illustrated in FIG. 31, a custom non-polarized prime polygon array assembly 214*f* can be produced by layering variations of non-polarized panels (i.e. FIG. 16). Here non-polarized prime polygon reflector arrays such as 158*f* are layered. An exposed reflector populated surface 226*f* (illustrated here as smooth after application of absorptive media) absorbs incoming waveform energy. Again, in some embodiments, the array panels are identical but rotated when stacked against each other to provide variation. In other embodiments, the array panels are non-identical.

Figure 32:
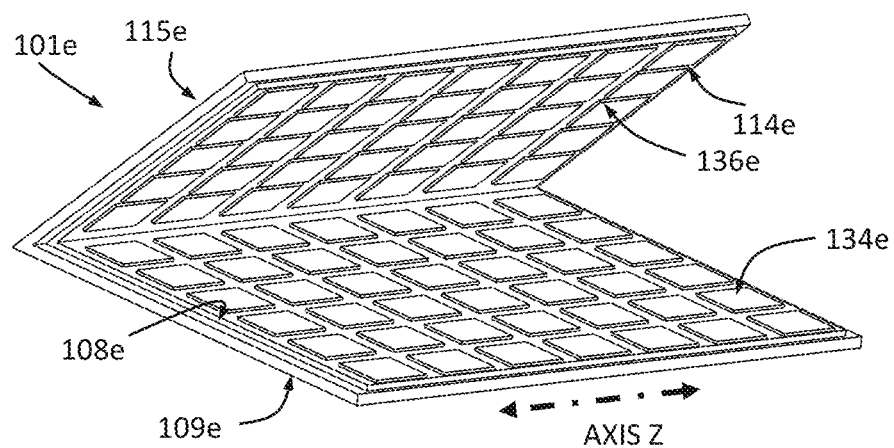
FIG. 32 is a perspective view of a truncated prime polygon reflector configured for use in the collection of solar energy according to one or more embodiments shown and described herein.
Figure 33:
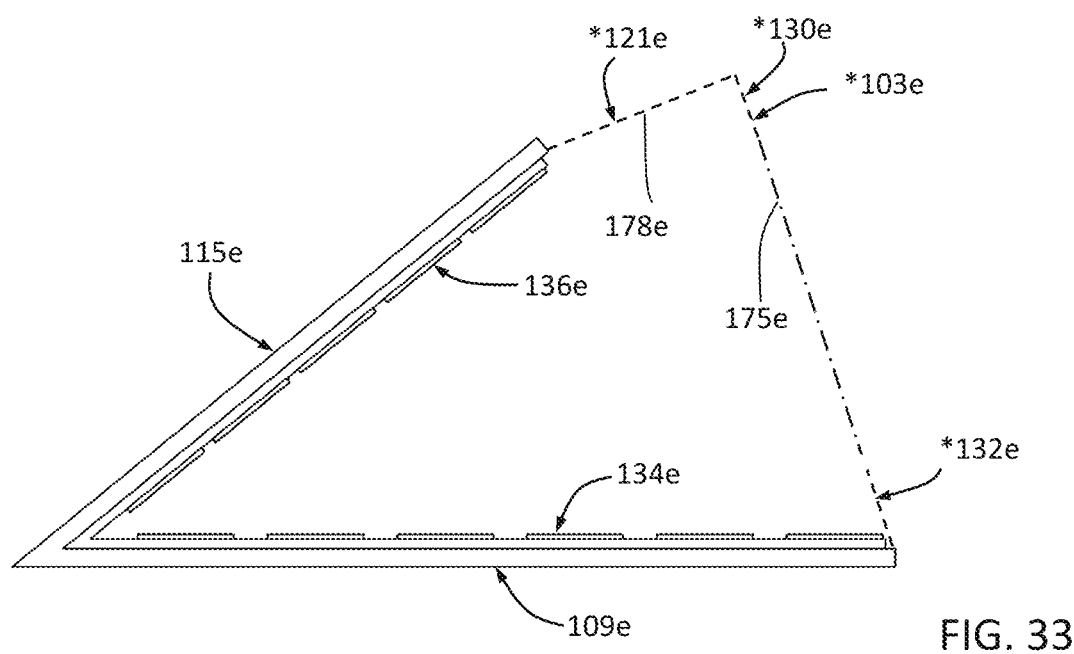
FIG. 33 is an end view of the truncated prime polygon reflector (* indicates truncated) of FIG. 32 with third reflective reference and exposure reference according to one or more embodiments shown and described herein.
Figure 34:
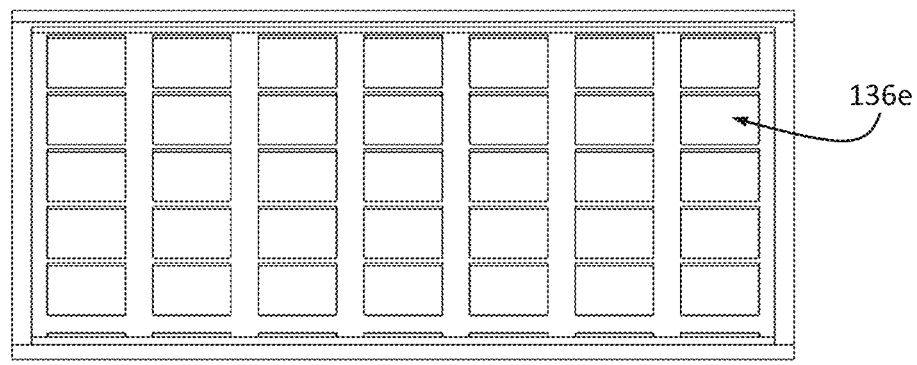
FIG. 34 is a front view of the truncated prime polygon reflector of FIG. 32 according to one or more embodiments shown and described herein.

In some applications, one or more reflective faces may be truncated due to space limitations or other reasons. For example, an exposure face may be truncated for the collection of solar energy. As illustrated in FIGS. 32-34, walls and faces of a prime polygon reflector 101*e* are truncated (signified by *) in a manner suitable for use in the collection of solar energy (i.e. dotted lines represent truncated portions of a prime polygon reflector and underlying third reflective reference 178*e* and underlying exposure reference 175*e*). In this embodiment, a first absorptive media 134*e* and second absorptive media 136*e* is in the form of solar collectors disposed adjacent the corresponding first and second reflective faces 108*e*, 114*e*. Properties of prime polygon reflector 101*e* cause incident ray energy to strike the absorptive media multiple times before exiting the prime polygon reflector back to the environment. Absorptive material in the revolved prime polygon reflectors illustrated in FIG. 9*g* and 10*g* may alternatively be in the form of one or more of a: solar collector, solar cell, solar film, and solar coating.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A prime polygon reflector comprising:
    a reflection chamber;
    wherein said reflection chamber comprises an exposure reference, a first reflective wall with first reflective face thereon, a second reflective wall with second reflective face thereon;
    said exposure reference of predetermined length H between a first end and a second end measured inside said reflection chamber for exposure to electromagnetic energy;
    a generally linear first reflective face;
    said first reflective face bounded by a third end and a fourth end and having a nominal length of ($\sqrt{3}$H) as measured inside said reflection chamber with a variance range between +0.15$\sqrt{3}$H and −0.15$\sqrt{3}$H;
    said third end of said first reflective face intersecting said second end of said exposure reference;
    an angle $\alpha$ having a nominal value of 16.917899 degrees and a maximum value of 18.2 degrees and a minimum value of 15.5 degrees;
    said first reflective face angled 90 minus $\alpha$(90-$\alpha$) degrees from said exposure reference;
    a generally linear second reflective face bounded by a fifth end and a sixth end;
    said fifth end of said second reflective face intersecting said fourth end of said first reflective face;
    said second reflective face angled (90-3$\alpha$) degrees from said first reflective face;
    said sixth end of said second reflective face terminating at the point of intersection with a line extending orthogonally from said first end of said exposure reference toward said second reflective face;
    wherein said exposure reference and said first reflective face and said second reflective face define said reflection chamber.

2. The prime polygon reflector of claim 1 wherein at least one of: said exposure reference, said first reflective face, and said second reflective face are generally planar in an elongated configuration.

3. The prime polygon reflector of claim 2 wherein said exposure reference and said first reflective face and said second reflective face are positioned generally perpendicular to a common plane.

4. A plurality of prime polygon reflectors according to claim 1 chosen from prime polygon reflectors having generally planar reflective faces extending orthogonally from a common plane;
    wherein said plurality of chosen prime polygon reflectors are arranged into a prime polygon reflector array.

5. A plurality of prime polygon reflectors according to claim 4 wherein said prime polygon reflector arrays are layered.

6. The plurality of prime polygon reflectors as in claim 5 wherein said prime polygon reflectors are formed into prime polygon reflector arrays and arranged into multi-layer prime polygon reflector array assemblies.

7. The prime polygon reflector of claim 3 wherein a plurality of prime polygon reflectors are arranged according to one or more of: A) in an array, and B) in a multi-layer assembly.

8. The prime polygon reflector of claim 4 further comprising:
    an axis Z;
    wherein said axis Z is one of linear and curvilinear; and
    wherein said first reflective face and said second reflective face extend along axis Z.

9. The prime polygon reflector as defined by claim 3 further comprising:
    a plurality of adjacent said prime polygon reflectors.

10. The prime polygon reflector of claim 9 further comprising;
    one or more of a side mounting flange and an end mounting flange extending along at least a portion of one or more ends of the plurality of adjacent said prime polygon reflectors; and
    a mounting hole extending through said one or more of a side mounting flange and end mounting flange operable for receiving fasteners to secure the plurality of adjacent said prime polygon reflectors to a structure.

11. The prime polygon reflector of claim 9 further comprising:
    a panel frame operable to surround sides of the plurality of adjacent said prime polygon reflectors;
    said panel frame defining a panel cavity; and
    wherein the plurality of adjacent said prime polygon reflectors are seated in said panel cavity.

12. The prime polygon reflector of claim 11 further comprising:
    at least one support base;
    said at least one support base secured to an inferior end of said panel frame and operable to hold said panel frame upright.

13. The prime polygon reflector of claim 9 further comprising;
an electrical terminal; and
said electrical terminal electrically connected to the plurality of adjacent said prime polygon reflectors.

14. The prime polygon reflector of claim 9 further comprising:
a slotted stud operable for use in building a wall in one or more of within and in a building structure;
said slotted stud comprising one or more prime polygon slots;
said one or more prime polygon slots replicating the prime polygon geometry of the plurality of adjacent said prime polygon reflectors and operable for seating a portion of the plurality of adjacent said prime polygon reflectors therein.

15. The prime polygon reflector of claim 14 further comprising:
a plurality of spaced said slotted studs forming a wall;
said prime polygon slots in said slotted studs aligned between said slotted studs; and
whereby one or more of the plurality of adjacent said prime polygon reflectors is housed in said prime polygon slots and extend between said spaced studs.

16. The prime polygon reflector of claim 9 wherein the plurality of adjacent said prime polygon reflectors is formed as a continuous sheet of material.

17. The prime polygon reflector of claim 9 further comprising:
reflector plates;
wherein the plurality of adjacent said prime polygon reflectors utilizes an organized arrangement of said reflector plates positioned at specified angles to form the plurality of adjacent said prime polygon reflectors.

18. The prime polygon reflector of claim 9 further comprising:
a building structure;
wherein the plurality of adjacent said prime polygon reflectors is secured between support members in said building structure.

19. The prime polygon reflector of claim 9 further comprising:
at least one of the plurality of adjacent said prime polygon reflectors having a differing rejection band; and
whereby the plurality of adjacent said prime polygon reflectors are layered.

20. The prime polygon reflector of claim 9 further comprising:
at least one of a building structure and a shield enclosure;
wherein one or more of the plurality of adjacent said prime polygon reflectors are one or more of anchored and supported adjacent to the exterior of said structure.

21. The prime polygon reflector of claim 9 wherein one or more of the plurality of adjacent said prime polygon reflectors are one or more of anchored to and supported adjacent to one or more adjacent interior surfaces of a shielded room.

22. The prime polygon reflector of claim 21 further comprising:
a signal conductor;
wherein said signal conductor is electrically coupled to the plurality of adjacent said prime polygon reflectors.

23. The prime polygon reflector of claim 9 wherein at least one of said prime polygon reflectors is portable.

24. The prime polygon reflector of claim 9 wherein at least one of said prime polygon reflectors is formed into the surface of an object.

25. A plurality of said prime polygon reflectors as defined in claim 1 wherein individual said prime polygon reflectors are chosen from one or more of the following prime polygon reflector groups: A) prime polygon reflectors having a reflection chamber that is generally conically shaped and characterized by rotation of one or more of said first reflective face and said second reflective face about an axis having one end intersecting said first end of said reference and orthogonal to said reference, and B) prime polygon reflectors having a reflection chamber that is generally conically shaped and characterized by rotation of one or more of said first reflective face and said second reflective face about an axis having one end intersecting said second end of said reference and orthogonal to said reference, and wherein each prime polygon reflector comprises a reference length H that is constant or varies between one or more of said prime polygon reflectors; and
wherein the plurality of said prime polygon reflectors are positioned adjacent to each other.

26. The prime polygon reflector of claim 25 wherein the plurality of adjacent said prime polygon reflectors are formed as a continuous sheet.

27. The prime polygon reflector of claim 25 wherein at least one of the plurality of adjacent said prime polygon reflectors are formed into the surface of an object.

* * * * *